(12) United States Patent  
Moriyama et al.

(10) Patent No.: US 11,634,074 B2  
(45) Date of Patent: Apr. 25, 2023

(54) IMAGE FORMING DEVICE AND IMAGE FORMING METHOD

(71) Applicants: DENSO CORPORATION, Kariya (JP); TOYOTA JIDOSHA KABUSHIKI KAISHA, Toyota (JP)

(72) Inventors: Shinichi Moriyama, Kariya (JP); Yasuyoshi Sawada, Kariya (JP); Yamato Yorifuji, Aichi-ken (JP); Jun Kamishima, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/645,548

(22) Filed: Dec. 22, 2021

(65) Prior Publication Data

US 2022/0203895 A1    Jun. 30, 2022

(30) Foreign Application Priority Data

Dec. 25, 2020    (JP)  ............................. JP2020-216417

(51) Int. Cl.  
*B60R 1/00*    (2022.01)

(52) U.S. Cl.  
CPC ........ *B60R 1/002* (2013.01); *B60R 2300/105* (2013.01); *B60R 2300/302* (2013.01); *B60R 2300/308* (2013.01); *B60R 2300/605* (2013.01); *B60R 2300/607* (2013.01)

(58) Field of Classification Search  
CPC .............. B60R 1/002; B60R 2300/105; B60R 2300/302; B60R 2300/308; B60R 2300/605; B60R 2300/607; B60R 1/23; B60R 2300/303; B60R 2300/602; G06T 5/50; G06T 3/005; G06T 7/70;  
(Continued)

(56) References Cited

U.S. PATENT DOCUMENTS

| 2010/0250064 A1* | 9/2010 | Ota ..................... B60W 40/076 348/148 |
| 2014/0055487 A1* | 2/2014 | Kiyo ........................ B60R 1/00 345/629 |

(Continued)

FOREIGN PATENT DOCUMENTS

JP    2013-074350 A    4/2013

*Primary Examiner* — Nathnael Aynalem  
(74) *Attorney, Agent, or Firm* — Maschoff Brennan

(57) ABSTRACT

An image acquisition unit acquires camera images obtained by cameras, which are configured to photograph a periphery of the vehicle. An image synthesizing unit projects data of the camera images on a virtual projection surface, which corresponds to the periphery of the vehicle, and forms a synthetic image showing the periphery of the vehicle, which is viewed from a virtual view point, by using the data projected on the projection surface. A travelling-environment determination unit determines whether a travelling environment of the vehicle is an off-road or an on-road based on a signal from an other on-board device of the vehicle. The image synthesizing unit is configured to change a shape of the projection surface, which is for forming the synthetic image, according to whether the travelling-environment determination unit determines that the travelling environment is an off-road.

14 Claims, 10 Drawing Sheets

(58) Field of Classification Search
CPC ........... G06T 2207/20221; G06T 2207/30252; G03B 37/04; G06V 20/58; H04N 5/2658
USPC ........................................................ 348/148
See application file for complete search history.

(56) References Cited

U.S. PATENT DOCUMENTS

| | | | |
|---|---|---|---|
| 2014/0347450 A1* | 11/2014 | Han | G06T 3/0031 |
| | | | 348/47 |
| 2016/0182823 A1 | 6/2016 | Murasumi et al. | |
| 2016/0350894 A1 | 12/2016 | Kosaki | |
| 2020/0035207 A1* | 1/2020 | Maruoka | G09G 5/36 |

* cited by examiner

IMAGE FORMING DEVICE AND IMAGE FORMING METHOD

CROSS REFERENCE TO RELATED APPLICATION

The present application claims the benefit of priority from Japanese Patent Application No. 2020-216417 filed on Dec. 25, 2020. The entire disclosures of all of the above applications are incorporated herein by reference.

TECHNICAL FIELD

The present disclosure relates to a technique for forming a synthetic image showing a periphery of a vehicle by using captured images.

BACKGROUND

Conventionally, a vehicle is installed with a plurality of cameras at a plurality of positions to capture a plurality of camera images, respectively. An image display system is installed in the vehicle to form a synthetic image showing the periphery of a vehicle by using the camera images.

SUMMARY

According to an aspect of the present disclosure, an image forming device for a vehicle comprises an image acquisition unit configured to acquire a plurality of camera images obtained by a plurality of cameras. The image forming device further comprises an image synthesizing unit configured to project data of the plurality of camera images on a virtual projection surface, which corresponds to the periphery of the vehicle, and to form a synthetic image showing the periphery of the vehicle by using the data projected on the projection surface.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
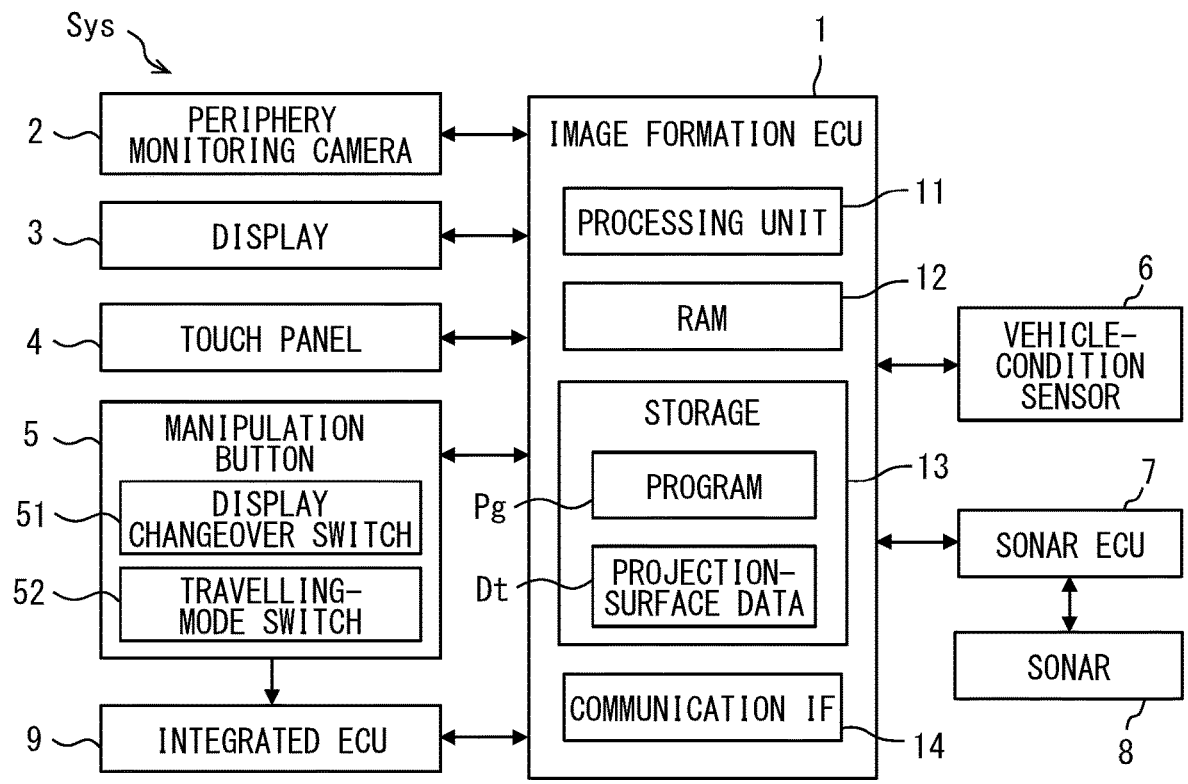
FIG. 1 is a block diagram illustrating the overview of a periphery display system Sys.

Hereinafter, example of the present disclosure will be described as follows. According to an example, an image display system synthesizes images captured by a plurality of cameras installed at a plurality of positions in a vehicle to form a synthetic image showing the periphery of a vehicle which is viewed from a virtual view point. Further, the image display system displays this synthetic image. The synthetic image is, for example, an overlooking image showing the periphery of a vehicle in such a way as to look down on the vehicle from the above, a driver's view-point image showing the periphery of a vehicle, which is viewed from a driver's view point in such a way as to transparently pass through an instrument panel, and the like.

A synthetic image showing the periphery of a vehicle which is viewed from a virtual view point, as described above, is formed by projecting data of a plurality of captured images on a virtual projection surface corresponding to the periphery of the vehicle and by using the data on the projection surface.

The shape of the projection surface is, for example, a horizontal surface, a bowl shape and the like. In this case, the bowl shape is such a shape as to be substantially horizontal near the vehicle and, also, to have an inclination gradually increasing as the distance from the position of the vehicle increases. The curved surface in the bowl shape corresponds to a rotational parabolic surface formed by rotating a parabola. Such bowl shapes include a shape formed from a flat-surface region which is flattened, and a downwardly-convex curved-surface region coupled to the periphery of the flat-surface region.

According to an example, a configuration is employable to change over the projection surface to a predetermined specific projection surface from a normal projection surface with a bowl shape which has a vehicle-around region formed flatly, if an obstruction is detected or based on user's manipulations for commanding enlarged display. The specific projection surface is a projection surface having a shape formed from a rectangular flat surface corresponding to a vehicle region, and an upwardly-convex curved-surface region provided around the flat surface.

By utilizing the aforementioned image display system, the user (a representative example thereof is a driver) is allowed to recognize the state of the periphery of the vehicle substantially in real time.

The image forming devices may be structured based on the premise that the vehicle resides on a road paved with asphalt, concrete, bricks, stones and the like (namely, an on-road). In other words, the aforementioned image forming device may be based on the premise that there is a flat ground surface in the periphery of the vehicle. Therefore, the projection surface corresponding to the vehicle-around region is formed substantially flatly. In this case, "the vehicle-around region" denotes a range at a distance of 2 m to 3 m from the vehicle, for example.

However, the developer of the present disclosure has found the following, by studying structures configured to display synthetic images such as driver's view-point images even during travelling on off-roads. Namely, it has been found that, with such synthetic images employing the projection surface set substantially flatly in the periphery of the vehicle, images of rocks and stones existing in the periphery of the vehicle are crushed to be flattened therein, which may cause the user to feel a sense of incongruity about these images.

According to an example of the present disclosure, an image forming device for a vehicle comprises an image acquisition unit configured to acquire a plurality of camera images obtained by a plurality of cameras, which are configured to photograph a periphery of the vehicle. The image forming device further comprises an image synthesizing unit configured to project data of the plurality of camera images on a virtual projection surface, which corresponds to the periphery of the vehicle, and to form a synthetic image showing the periphery of the vehicle, which is viewed from a virtual view point, by using the data projected on the projection surface. The image forming device further comprises a travelling-environment determination unit configured to determine whether a travelling environment of the vehicle is an off-road or an on-road based on a signal from an other on-board device of the vehicle. The image synthesizing unit is configured to change a shape of the projection surface, which is for forming the synthetic image, according to whether the travelling-environment determination unit determines that the travelling environment is an off-road.

With the aforementioned structure, when the travelling environment has been determined to be an off-road, a synthetic image is formed using a projection surface with a different shape from that of when it has been determined that the vehicle resides on an on-road. Namely, it is possible to employ a projection surface with a shape based on the premise that the travelling environment of the vehicle is an off-road. Therefore, it is possible to form a synthetic image less prone to cause the user to feel a sense of incongruity thereabout, as a synthetic image to be displayed during travelling on an off-road.

According to an example of the present disclosure, an image forming method is for forming an image for assisting driving of a vehicle. The method comprises acquiring a plurality of camera images obtained by a plurality of cameras, which are configured to photograph a periphery of the vehicle. The method further comprises projecting data of the plurality of camera images on a virtual projection surface corresponding to the periphery of the vehicle and forming a synthetic image showing the periphery of the vehicle, which is viewed from a virtual view point, by using the data projected on the projection surface. The method further comprises determining whether a travelling environment of the vehicle is an off-road or an on-road based on a signal from an other on-board device of the vehicle. The method further comprises changing a shape of the projection surface, which is for forming the synthetic image, according to determination whether the travelling environment is an on-road.

The aforementioned structure is a method corresponding the image forming device described above. With the aforementioned method, when the travelling environment of the vehicle is an off-road, it is possible to employ a projection surface based on the premise that the travelling environment is an off-road, which has a different shape from that of the projection surface employed when the vehicle resides on an on-road. Therefore, it is possible to form a synthetic image less prone to cause the user to feel a sense of incongruity thereabout, as a synthetic image to be displayed during travelling on an off-road.

Hereinafter, with reference to the drawings, there will be described embodiments of a periphery display system Sys according to the present disclosure. The periphery display system Sys displays, on a display, images of the periphery of a vehicle incorporating this system. Hereinafter, the vehicle V incorporating the periphery display system Sys will be also referred to as one's subject vehicle.

<Introductions>

One's subject vehicle according to the present embodiment is a four-wheel-drive car which is estimated to travel not only on paved roads (namely, on-roads), but also on off-roads. One's subject vehicle has a normal mode suitable for travelling on on-roads, and off-road modes, as travelling modes. As the off-road mode, one's subject vehicle may have a first off-road mode suitable for travelling on slippery road surfaces such as muddy roads, sandy roads, and a second off-road mode suitable for travelling on road surfaces with larger concavity and convexity, such as mogul roads, rocky roads. In the respective travelling modes, the distribution of driving force to the respective wheels is controlled in different ways. In this case, the term "off-road" mainly designates a ground surface having larger concavity and convexity, such as a rocky road. As a matter of course, "off-roads" can be understood to designate ground surfaces other than on-roads, namely unpaved ground surfaces in general.

In the following description, the forward, rearward, leftward, rightward, upward and downward directions are each defined with respect to one's subject vehicle. More specifically, the forward and rearward directions correspond to the longitudinal directions of one's subject vehicle. The leftward and rightward directions correspond to the widthwise directions of one's subject vehicle. The upward and downward directions correspond to the heightwise directions of the vehicle. From another standpoint, the upward and downward directions correspond to directions perpendicular to a plane parallel to the forward and rearward directions and the leftward and rightward directions. In the present disclosure, a plane perpendicular to the vehicle heightwise direction is also referred to as a vehicle horizontal plane. Directions perpendicular to the vehicle heightwise direction, which include the forward, rearward, leftward and rightward directions, are also referred to as vehicle horizontal directions.

The vehicle horizontal directions correspond to directions which get farther away from one's subject vehicle.

In addition, in the present disclosure, "parallel" is not limited to a completely-parallel state. "Parallel" may be a state of being inclined by several degrees to about 20 degrees. Namely, "parallel" may include generally-parallel states (so-called substantially-parallel states). In the present disclosure, the expression "perpendicular" is not limited to a completely-perpendicular state and may include states of being inclined by several degrees to about 20 degrees.

<Description of the Entire Structure>

FIG. 1 is a view illustrating an example of a schematic structure of a periphery display system Sys according to the present disclosure. As illustrated in FIG. 1, the periphery display system Sys includes an image formation ECU 1, a plurality of cameras 2, a display 3, a touch panel 4, manipulation buttons 5, vehicle-condition sensors 6, a sonar ECU 7, a plurality of sonars 8, and an integration ECU 9. Among the denominations of the members, the term "ECU", which is an abbreviation for Electronic Control Unit, means an electronic control device.

The image formation ECU 1 is connected to the plurality of cameras 2, the display 3, the touch panel 4, the manipulation buttons 5, the vehicle-condition sensors 6, the sonar ECU 7 and the integration ECU 9, in such a way as to communicate with respective one of them. The plurality of sonars 8 are connected to the sonar ECU 7. The image formation ECU 1 may be connected to the aforementioned various devices or sensors, either individually through dedicated lines or through a vehicle-inside network which is a communication network structured in the vehicle. For example, the image formation ECU 1 may be directly connected to the cameras 2 through dedicated picture signal lines.

The image formation ECU 1 is an ECU, as follows. That is, the ECU forms a synthetic image CP of a vehicle peripheral region viewed from an arbitrary view point, based on image data inputted from the respective cameras 2, as an image for assisting manipulations for driving a vehicle V. Further, the ECU displays the synthetic image on the display 3. The image formation ECU 1 is realized using a computer. Namely, the image formation ECU 1 includes a processing unit 11, a RAM 12, a storage 13, an I/O 14, and bus lines for connecting these structures to each other.

The processing unit 11 is hardware for arithmetic processing (in other words, an arithmetic core), which is connected to the RAM 12. The processing unit 11 is a CPU, for example. The processing unit 11 executes various processing for realizing the functions of respective functional units, which will be described later, by accessing the RAM 12. The RAM 12 is a volatile storage medium.

The storage 13 is structured to include a non-volatile storage medium, such as a flash memory. The storage 13 stores an image formation program Pg as firmware, and various data for enabling an image synthesizing unit F7 to form synthetic images. This data for use in forming synthetic images includes a plurality of pieces of projection-surface data Dt having different parameters which define surface shapes and the like. Execution of the image formation program Pg by the processing unit 11 corresponds to execution of an image forming method which is a method corresponding to this image formation program Pg. The I/O 14 is a circuit module for communication with other devices. The I/O 14 is realized using analog circuit elements, ICs and the like. The image formation ECU 1 will be described later separately, in more detail.

Figure 2:
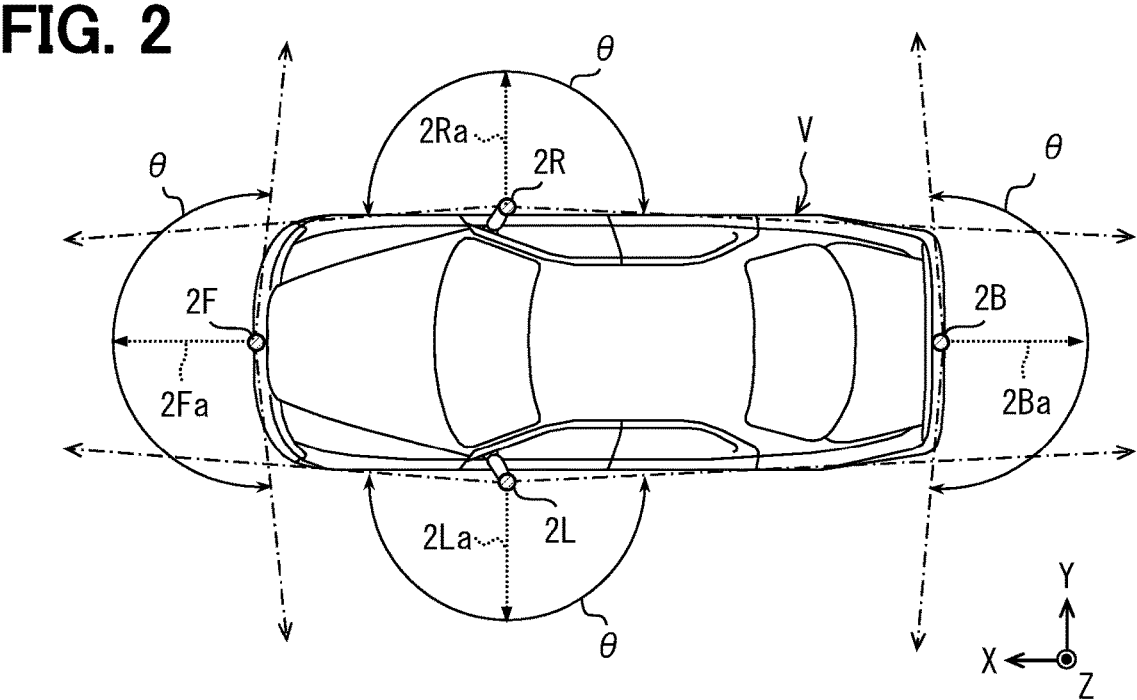
FIG. 2 is a view illustrating an example of the positions at which respective cameras 2 are installed, and the ranges of photographing by the respective cameras 2.

The cameras 2 are in-vehicle cameras configured to photograph the periphery of one's subject vehicle and to output data of images resulted from the photographing to the image formation ECU 1. Each of the cameras 2 includes at least a lens and an image-pickup element and electronically acquires an image showing a periphery of one's subject vehicle. The plurality of cameras 2 are mounted at predetermined positions on one's subject vehicle at predetermined attitudes, in such a way as to photograph respective different ranges. The periphery display system Sys according to the present embodiment includes a front camera 2F, a rear camera 2B, a left-side camera 2L, and a right-side camera 2R, as the cameras 2, as illustrated in FIG. 2. These four cameras 2 are placed at respective different positions in one's subject vehicle and are configured to photograph the periphery of one's subject vehicle in respective different directions. More specifically, this is attained as follows.

The front camera 2F is a camera for photographing the forward of the vehicle at a predetermined angle of view. The front camera 2F is mounted at such an attitude that its optical axis 2Fa is oriented in the frontward direction of one's subject vehicle, at a front edge of one's subject vehicle, such as a front grill, for example. The rear camera 2B is a camera for photographing the rearward of the vehicle at a predetermined angle of view. The rear camera 2B is mounted at such an attitude that its optical axis 2Ba is oriented rearwardly of one's subject vehicle, at a predetermined position on the body rear-surface portion, such as near the rear number plater or near the rear window, for example. The left-side camera 2L is a camera for photographing the left of one's subject vehicle. The left-side camera 2L is mounted on a left-side mirror, at such an attitude that its optical axis 2La is oriented leftwardly of one's subject vehicle. The right-side camera 2R is a camera for photographing the right of one's subject vehicle. The right-side camera 2R is mounted on a right-side mirror at such an attitude that its optical axis 2Ra is oriented rightwardly of one's subject vehicle.

As the lenses in these cameras 2, wide-angle lenses such as fish-eye lenses are employed, and each of the cameras 2 has an angle of view 8 equal to or more than 180 degrees. Therefore, by using the four cameras 2, it is possible to photograph the entire range around one's subject vehicle. Further, it is possible to properly change the aforementioned positions at which the respective cameras 2 are mounted. The front camera 2F may be also mounted to the room mirror or the upper end portion of the front glass. The right-side camera 2R and the left-side camera 2L may be also placed near the root portions of an A pillar and a B pillar. The periphery display system Sys may also include a camera 2 mounted on the roof. Some or all of the cameras 2 may be also cameras which are later-appended on the roof, on the dash board, near the window frames and the like, for example.

The storage 13 stores data indicating the positions and the attitudes at which the respective cameras 2 are mounted in the vehicle V (hereinafter, which will be referred to as "mounting position data"). The positions at which the respective cameras 2 are mounted may be expressed as points in 3D coordinates centered at an arbitrary position in the vehicle V (hereinafter, referred to as a vehicle 3D coordinate system), for example. An X axis which forms the vehicle 3D coordinate system may be an axis parallel to the leftward-and-rightward direction of the vehicle, for example. Further, a Y axis can be an axis parallel to the forward-and-rearward direction. A Z axis can be an axis parallel to the heightwise direction of the vehicle. The rightward direction of the vehicle corresponds to the X-axis positive direction, the forward direction of the vehicle corresponds to the Y-axis positive direction, and the upward direction of the vehicle corresponds to the Z-axis positive direction. The center of the vehicle 3D coordinate system can be the center of the rear wheel shaft, for example.

The display 3 is a device which includes a thin-type display panel such as a liquid crystal display panel, for example, and displays various types of information and images thereon. The display 3 corresponds to a display device. The display 3 is placed in the instrument panel or the like in one's subject vehicle, in such a way as to allow a user to view its screen. The display 3 may be also placed within the same housing as that of the image formation ECU 1 and, thus, may be integrated with the image formation ECU 1. As a matter of course, the display 3 may be also a device separated from the image formation ECU 1. The display 3 includes the touch panel 4 laminated on the display panel and, thus, is enabled to receive user's manipulations thereon. The touch panel 4 is constituted by a capacitance-type touch panel, for example, and is configured to output signals indicative of positions touched by the user. Here, the term "user" mainly designates an occupant in the driver's seat (so-called a driver). The term "user" may also include an occupant in the assistant driver's seat, besides the driver.

The manipulation buttons 5 are manipulation members which receives user's manipulations thereon. The periphery display system Sys may include a display changeover switch 51 and a travelling-mode switch 52, as the manipulation buttons 5. The display changeover switch 51 is a switch for displaying a synthetic image CP formed by the image formation ECU 1 on the display 3 and for changing a virtual view point and the like of a synthetic image CP to be displayed thereon. The display changeover switch 51 is provided on the steering wheel in one's subject vehicle, for example, and mainly receives driver's manipulations thereon. The user can perform various manipulations on the periphery display system Sys, through the display changeover switch 51 and the touch panel 4 on the display 3. If the user performs a manipulation on the display changeover switch 51 or the touch panel 4, a manipulation signal indicating the content of this manipulation is inputted to the image formation ECU 1. The display changeover switch 51 can be also referred to as a multi-information switch. The display changeover switch 51 may be also placed on the instrument panel.

The travelling-mode switch 52 is a button for enabling the driver to change over the travelling mode of the vehicle V. The travelling-mode switch 52 may be also provided in a center console, the instrument panel or the like. As the travelling-mode switch 52, buttons corresponding to respective travelling modes may be placed. The travelling-mode switch 52 may be structured to be a rotary switch. The manipulation member for changing over the travelling mode may be of a dial type. The shift lever may be also provided with the function of the travelling-mode switch 52. The travelling-mode switch 52 and the shift lever correspond to an input device for changing over the travelling mode to an off-road mode.

The travelling-mode switch 52 outputs, to the image formation ECU 1, a signal indicative of the travelling mode being set by the user. The output signal from the travelling-mode switch 52 is also inputted to the integration ECU 9 which integrally controls a plurality of ECUs constituting a driving system in the vehicle. The integration ECU 9 corresponds to a domain ECU in a power-train system, for example. The integration ECU 9 changes over the travelling mode of the vehicle V and, also, integrally controls the behaviors of a power train ECU and a chassis ECU, in response to the input signal from the travelling-mode switch 52. This integration ECU 9 may be regarded as an ECU for managing the travelling mode of the vehicle, in one respect. The power unit to be controlled by the power train ECU is not limited to an engine, and may be also a motor. The power train ECU may also have the function of controlling the torque distribution to the front and rear wheels and, further, controlling the torques to the respective left and right rear wheels independently. For example, the power train ECU may also have the function of a TVD (Torque Vectoring Differential) ECU.

The vehicle-condition sensors 6 are sensors for detecting the quantities of conditions relating to the travelling control for one's subject vehicle. The vehicle-condition sensors 6 include a shift position sensor, a vehicle-speed sensor, a steering-angle sensor, an acceleration sensor, and the like. The shift position sensor is a sensor for detecting the position of the shift lever. The vehicle-speed sensor is a sensor for detecting the travelling speed of one's subject vehicle. The steering-angle sensor is a sensor for detecting the rotational angle of the handle (so-called a steering angle). The acceleration sensor is a sensor for detecting the acceleration acting on one's subject vehicle in at least one direction, out of the forward-and-rearward direction of the vehicle, the lateral direction and the upward-and-downward direction. In this case, it is assumed that a three-axis acceleration sensor is employed as the acceleration sensor. Values detected by the acceleration sensor can be utilized as materials for determining the vehicle attitude with respect to a horizontal plane. The types of the sensors employed in the periphery display system Sys as the vehicle-condition sensors 6 can be properly designed, and periphery display system Sys is not required to include all the aforementioned sensors. The vehicle-condition sensors 6 may also include a vehicle-height sensor, and the like. The respective sensors output data indicating the current values of the quantities of physical conditions to be detected (namely, the results of detections), to the image formation ECU 1.

The sonar ECU 7 is an ECU which controls the operations of the sonars 8. The sonars 8 generate an ultrasound as a probing wave and receive reflected waves resulted from reflection of the ultrasound by an object, thereby detecting the object existing in the periphery of one's subject vehicle. The sonars 8 are also capable of detecting the distance to the object, based on the time from the generation of the ultrasound therefrom to the returning of the ultrasound thereto. Information about the distance to the object, which has been detected by each sonar 8, is inputted to the image formation ECU 1 through the sonar ECU 7, for example.

Figure 3:
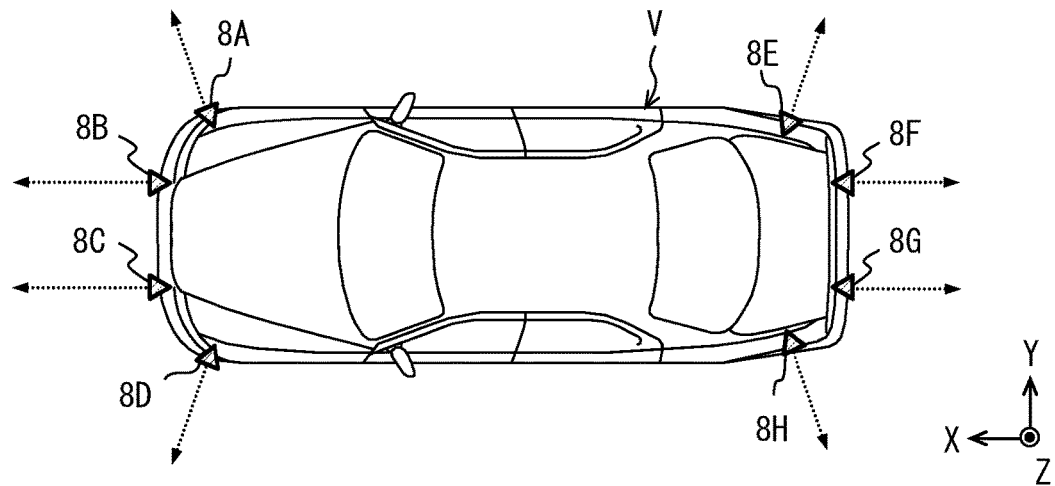
FIG. 3 is a view illustrating an example of the positions at which respective sonars 8 are installed, and the ranges of photographing by the respective sonars 8.

In the present embodiment, as illustrated in FIG. 3, as an example, there are provided the eight sonars 8. More specifically, from the right-side corner portion of the front bumper to the left-side corner portion thereof, four sonars 8A to 8D are placed in such a way as to be distributed. Further, from the right-side corner portion of the rear bumper of one's subject vehicle to the left-side corner portion thereof, four sonars 8E to 8H are placed in such a way as to be distributed. Through the sonars 8 placed as described above, the sonar ECU 7 can detect an object existing forward or rearward of one's subject vehicle. The aforementioned aspect of placement of the sonars 8 is merely an example, and the placement of the sonars 8 is not limited to the example illustrated in FIG. 3. Also, the sonars 8 may be mounted on a side sill, a fender, or a door panel, in such a way as to generate an ultrasound toward a region near a side of the vehicle.

Besides, the sonar ECU 7 identifies the relative position of an object existing in the periphery of one's subject vehicle, by combining the results of detections by the respective sonars 8. For example, regarding the direction of a detected object, the direction of this object relative to one's subject vehicle is derived, based on the respective distances to the same object which have been detected by two or more sonars 8. If the sonars 8 detect an object, the sonar ECU 7 inputs, to the image formation ECU 1, data indicating the direction of this object and the distance to this object as a result of detection. The sonar ECU 7 may be also structured to output the height of a detected object, the intensity of reflection thereby, received waveforms therefrom, to the image formation ECU 1, as information indirectly indicating whether the vehicle periphery is in an off-road environment. The sonar ECU 7 may be also structured to determine whether or not the peripheral environment is an off-road, such as a rocky place, and to output the result of the determination to the image formation ECU 1. The sonar ECU 7 may be also integrated with the image formation ECU 1.

<Regarding the Structure of the Image Formation ECU>

Figure 4:
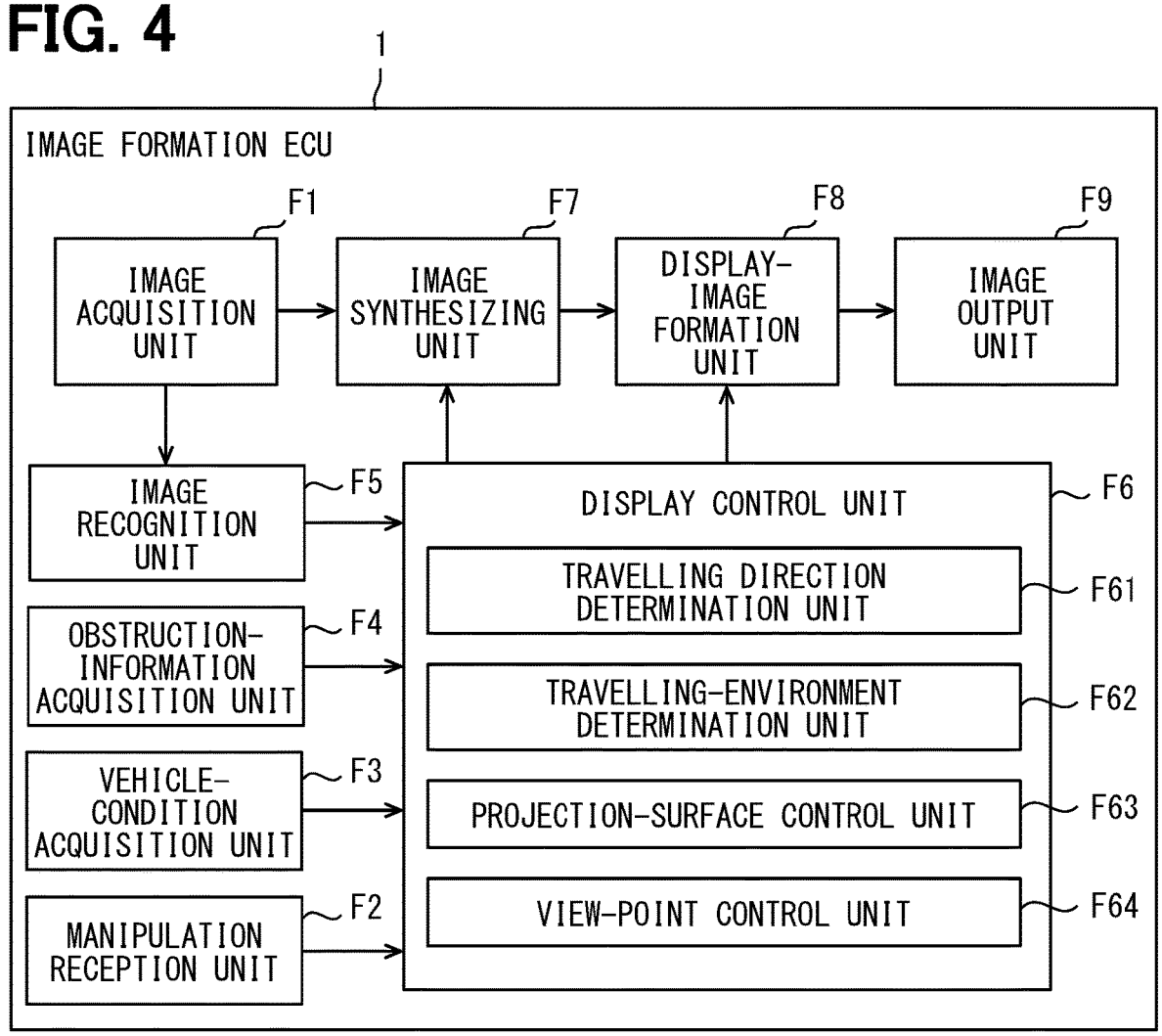
FIG. 4 is a block diagram for explaining the functions of an image formation ECU 1.

The image formation ECU 1 includes an image acquisition unit F1, a manipulation reception unit F2, a vehicle-condition acquisition unit F3, an obstruction-information acquisition unit F4, an image recognition unit F5, a display control unit F6, the image synthesizing unit F7, a display-image formation unit F8, and an image output unit F9, as functional units, as illustrated in FIG. 4.

Figure 5:
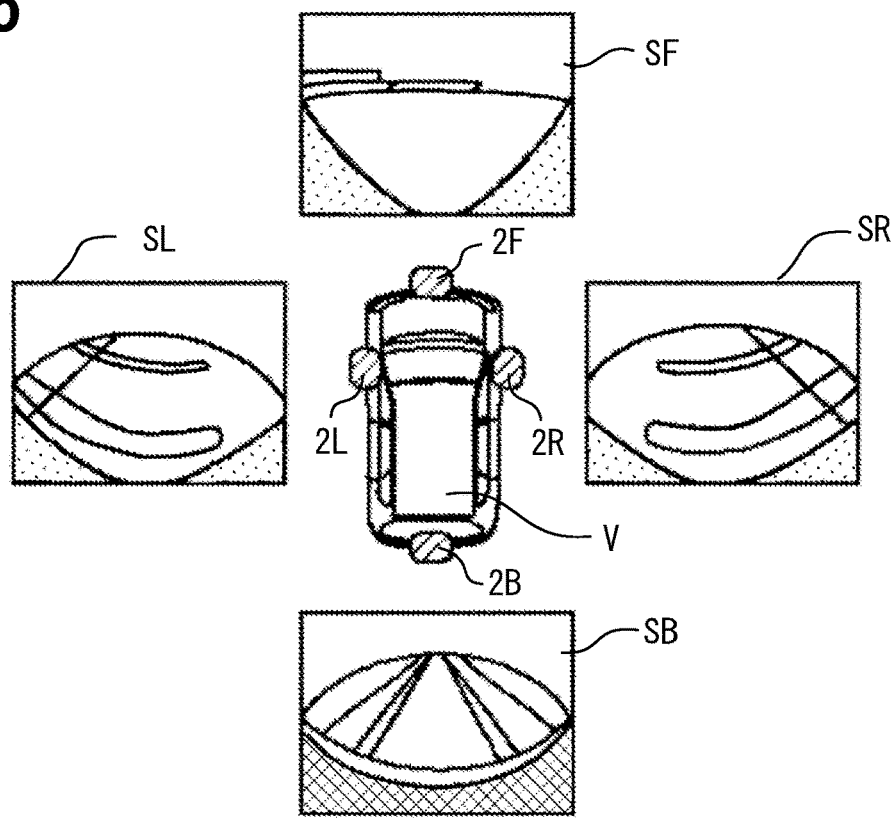
FIG. 5 is a view illustrating an example of camera images acquired by an image acquisition unit F1.

The image acquisition unit F1 acquires camera images which are images formed by the respective four cameras 2. If the plurality of cameras 2 perform photographing, as illustrated in FIG. 5, four camera images SF, SB, SL and SR showing the forward, rearward, leftward and rightward of one's subject vehicle, respectively, are acquired. These four camera images SF, SB, SL and SR include data of the entire range around one's subject vehicle. The camera image SF is an image formed by the front camera 2F, and the camera image SB is an image formed by the rear camera 2B. The camera image SL is an image formed by the left-side camera 2L, and the camera image SR is an image formed by the right-side camera 2R. The image acquisition unit F1 has the function of converting image signals inputted from the cameras 2 into digital image data of a predetermined data format, and the like. The image acquisition unit F1 performs predetermined image processing on the acquired camera images and inputs the processed camera images to the image synthesizing unit F7 and the display-image formation unit F8.

The manipulation reception unit F2 receives manipulation signals which are outputted from the manipulation buttons 5 and the touch panel 4, when the user has performed manipulations thereon. Thus, the manipulation reception unit F2 receives user's command manipulations with respect to the display of synthetic images CP and camera images. The manipulation reception unit F2 inputs data corresponding to the received manipulation signals, to the display control unit F6.

The vehicle-condition acquisition unit F3 is structured to acquire information indicating conditions of one's subject vehicle, from other devices provided in one's subject vehicle, separately from the image formation ECU 1, such as the vehicle-condition sensors 6. The vehicle-condition acquisition unit F3 acquires the shift position being currently set, from the shift position sensor, for example. The vehicle-condition acquisition unit F3 may acquire the travelling mode from the integration ECU 9. Besides, the vehicle-condition acquisition unit F3 acquires the accelerations in respective detection-axis directions, the vehicle speed, the steering angle and the like.

The obstruction-information acquisition unit F4 acquires information about a stereoscopic object existing in the periphery of the vehicle, from the sonar ECU 7. Namely, the obstruction-information acquisition unit F4 acquires the size, the height and the relative position of the detected stereoscopic object, and the like. When the sonar ECU 7 includes an identifier for identifying the type of a detected object by analyzing characteristic quantities of signal waveforms of reflected waves received thereby, the obstruction-information acquisition unit F4 also acquires the result of identification of the detected object by the sonar ECU 7.

The image recognition unit F5 is structured to detect the position of a predetermined detected object, the type thereof, and the like, by analyzing images inputted from the cameras 2. The image recognition unit F5 has the functions of an identifier for identifying types of objects, based on characteristic-quantity vectors in images, for example. The image recognition unit F5 identifies objects, using CNN (Convolutional Neural Network) techniques and DNN (Deep Neural Network) techniques which utilize deep learning, for example. Such detected objects include road signs such as lane markings which can be provided on paved roads, road edges, and the like, besides pedestrians and other vehicles. Such detected objects may also include stereoscopic constructions provided on roads, such as traffic signs such as destination boards, guard rails, telegraph poles, and the like.

In addition, the image recognition unit F5 may be structured to detect stones and rocks. The result of recognition by the image recognition unit F5 is outputted to the display control unit F6 and the like. Besides, the image recognition unit F5 may be structured to output the result of recognition which indicates whether the travelling environment is an on-road or an off-road, to the display control unit F6, based on the pattern of an image region estimated to be a ground surface (for example, the result of edge detection).

The display control unit F6 is structured to comprehensively control the entirety of the image formation ECU 1. For example, the display control unit F6 controls the image synthesizing unit F7 and the display-image formation unit F8 based on information inputted from the manipulation reception unit F2 and the vehicle-condition acquisition unit F3, thereby causing them to form a synthetic image CP and a displayed image DP according to the conditions of travelling of one's subject vehicle and settings made by the user.

The display control unit F6 includes a travelling-direction acquisition unit F61, a travelling-environment determination unit F62, a projection-surface control unit F63, and a viewpoint control unit F64, as sub functional blocks. The travelling-direction acquisition unit F61 determines whether the travelling direction of one's subject vehicle is a forward-travelling direction or a rearward-travelling direction, based on the direction of rotations of the tires or signals from the shift position sensor, for example.

The travelling-environment determination unit F62 is structured to determine whether the position at which one's subject vehicle is travelling (in other words, the travelling environment) is an on-road or an off-road. The travelling-environment determination unit F62 may be also referred to as a road-surface type determination unit for determining the types of road surfaces. For example, the travelling-environment determination unit F62 may determine whether the travelling environment is an off-road, based on input signals from the travelling-mode switch 52. For example, the travelling-environment determination unit F62 determines that the travelling environment is an off-road, based on the fact that a signal indicating an off-road mode being set is inputted from the travelling-mode switch 52. On the other hand, the travelling-environment determination unit F62 can determine that the travelling environment is a normal mode, based on the fact that a signal indicating a normal mode being set is inputted from the travelling-mode switch 52. The travelling-environment determination unit F62 may also determine whether the travelling environment is an off-road, based on information about the travelling mode which the vehicle-condition acquisition unit F3 has acquired from the integration ECU 9.

The travelling-environment determination unit F62 may also determine whether the travelling environment is an off-road, based on the result of recognition by the image recognition unit F5. For example, the travelling-environment determination unit F62 may determine that the travelling environment is an off-road, based on the fact that equal to or more than a predetermined number of objects having characteristics indicative of rocks have been detected, or rocks have been detected forward, rearward, leftward and rightward of the vehicle, through image recognition processing. The travelling-environment determination unit F62 may also determine that the travelling environment is an off-road, based on the fact that a plurality of obstructions have been continuously detected. In this case, "obstructions" designate natural stereoscopic objects such as rocks, level differences in ground surfaces, and the like, rather than artificial stereoscopic objects such as guard rails or other vehicles. Natural stereoscopic objects such as rocks have various shapes, which makes it hard to determine that the type of a detected object is a natural stereoscopic object, through image recognition. On the other hand, the type of an artificial object can be identified relatively easily. In view of such circumstances, the travelling-environment determination unit F62 may also determine whether or not the travelling environment is an off-road, by regarding detected stereoscopic objects the types of which could not be identified by image recognition processing, as natural stereoscopic objects. The travelling-environment determination unit F62 may also determine that the travelling environment is an off-road, on condition that the image recognition unit F5 has not detected an element indicating a paved road at any of the forward, rearward, leftward and rightward of the vehicle. Such an element indicating a paved road is a lane marking, a road edge or the like, for example.

The travelling-environment determination unit F62 may also determine that the travelling environment is an off-road, based on the fact that the sonars 8 have detected obstructions as described above, continuously or at the forward, rearward, leftward and rightward of the vehicle. The travelling-environment determination unit F62 may also determine whether the travelling environment is an off-road, through sensor fusion between image recognition processing and the sonars.

Besides, the travelling-environment determination unit F62 may also determine whether or not the travelling environment is an off-road, based on patterns detected by the acceleration sensor. For example, if the acceleration in the upward and downward direction has been continuously varying at an amplitude of a predetermined threshold value, for a constant distance (for example, 3 m), the travelling-environment determination unit F62 may determine that the travelling environment is an off-road. Similarly, if a vibration sensor has been continuously detecting vibrations of equal to or more than a predetermined threshold value for a constant distance, as the vehicle travels, the travelling-environment determination unit F62 may determine that the travelling environment is an off-road. The travelling-environment determination unit F62 may also determine that the travelling environment is an off-road, based on the fact that any of a plurality of tires has been idled. The travelling-environment determination unit F62 may also determine whether or not the travelling environment is an off-road, using map data and positional information about one's subject vehicle which has been identified by a GNSS (Global Navigation Satellite System). As types of information and determination conditions which are usable as materials for determining that the travelling environment is an off-road, it is possible to employ various types of information and determination conditions.

The travelling-environment determination unit F62 may determine that the travelling environment is an on-road, based on the fact that a condition required for determining that the travelling environment is an off-road is no longer satisfied. For example, the travelling-environment determination unit F62 may determine that the travelling environment is an on-road, based on the fact that a compartment line, a road edge, a guard rail, or a road sign has been detected through an image recognition processing. The travelling-environment determination unit F62 may also determine that the travelling environment is an on-road, based on the fact that the amplitude of the acceleration in the upward and downward direction, along with travelling, has fallen less than a predetermined value. As conditions required for determining that the travelling environment is an on-road, it is possible to employ various conditions.

Figure 6:
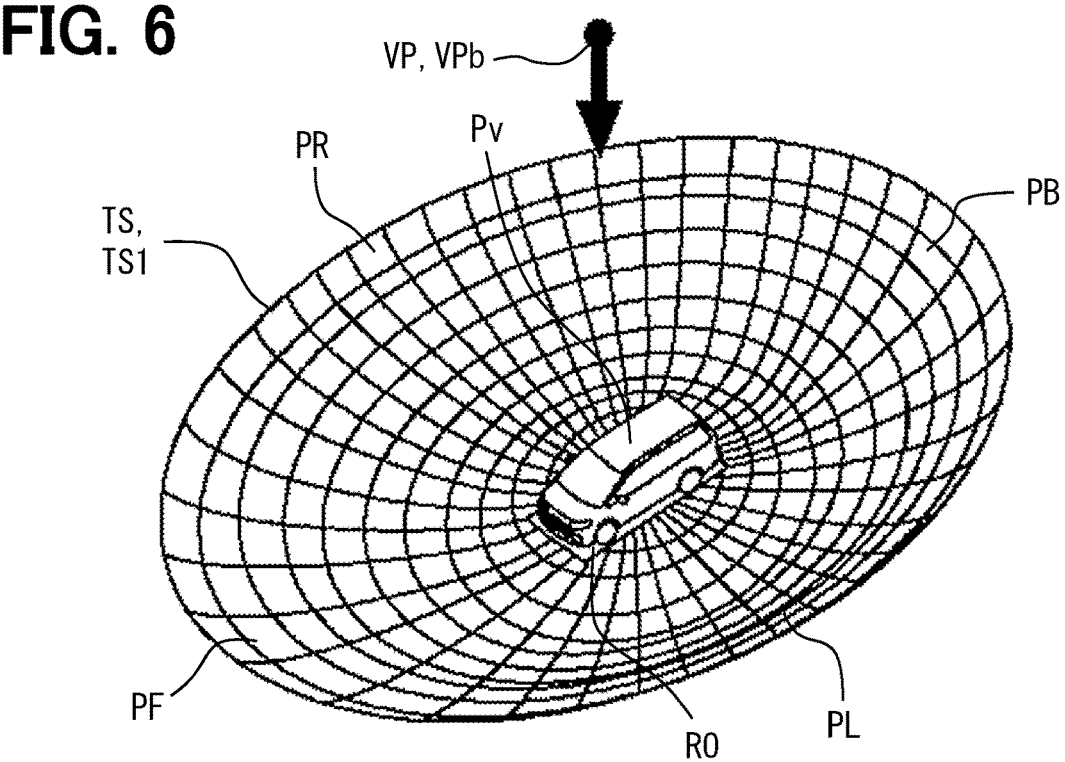
FIG. 6 is a view for explaining a projection surface TS.

The projection-surface control unit F63 is structured to change over a projection surface TS to be used for image synthesizing processing. The projection surface TS is a virtual stereoscopic surface corresponding to the peripheral region around one's subject vehicle, as conceptually illustrated in FIG. 6. A center region of the projection surface TS is defined as a vehicle region R0 as the position of one's subject vehicle. The image formation ECU 1 according to the present embodiment is structured to be capable of selectively using a normal projection surface and an off-road projection surface. The normal projection surface TS1 is a projection surface TS used when one's subject vehicle resides on an on-road, and the off-road projection surface TS2 is a projection surface TS used when one's subject vehicle resides on an off-road. The respective shapes of the plurality of projection surfaces TS are defined by a plurality of pieces of projection-surface data Dt which has been preliminarily stored in the travelling-environment determination unit F62. The projection surfaces TS will be described later separately, in more detail.

Changing over the projection surface for forming a synthetic image CP corresponds to changing over the display mode for the synthetic image CP, in one respect. For convenience, a mode for displaying a synthetic image CP using the off-road projection surface is referred to as an off-road display mode. A display mode for displaying a synthetic image CP using the normal projection surface is referred to as a normal display mode. Since the normal projection surface TS1 is a projection surface TS used when one's subject vehicle resides on an on-road, the normal projection surface TS1 can be referred to as an on-road projection surface. The normal display mode can be referred to as an on-road display mode.

The view-point control unit F64 sets the position and the sight direction of a virtual view point VP for forming a synthetic image CP, which will be described later, based on at least one of the result of the determination by the travelling-direction acquisition unit F61, the signal from the touch panel 4, and the signal from the display changeover switch 51. As settable patterns of the virtual view point VP, it is possible to employ a bird's-eye view point VPb, a driver's view point VPd, and the like. The bird's-eye view point VPb is a settable pattern of the virtual view point VP, wherein the view-point position is just above one's subject vehicle, and the field-of-view direction thereof is oriented just downward. It is possible to employ the bird's-eye view point VPb, in cases of forming bird's-eye images CPb, which are images of one's subject vehicle and the periphery thereof which are overlooked from just above the vehicle. The view-point position of the bird's-eye view point VPb is not limited to the position just above the vehicle, and may be a position deviated from the position just above the vehicle rearwardly, forwardly, or laterally. The bird's-eye view point VPb corresponds to an example of a vehicle-room outside view point, where the virtual view point VP is placed outside the vehicle room.

Figure 7:
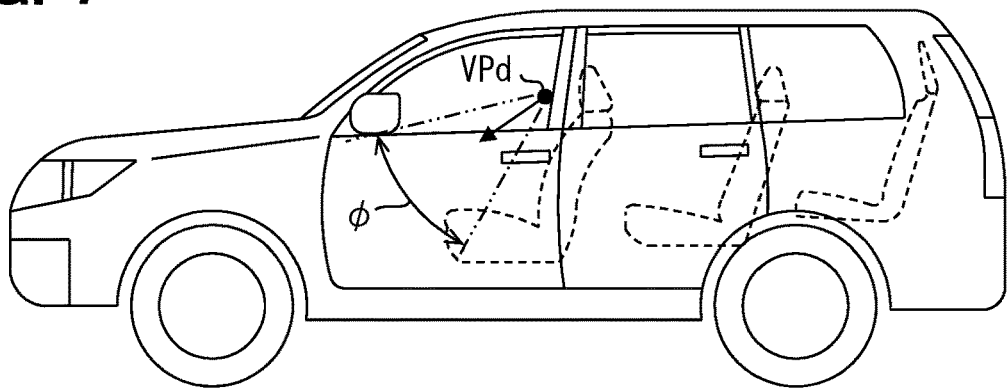
FIG. 7 is a view for explaining a driver's view point VPd.

The driver's view point VPd is a settable pattern of the virtual view point VP, wherein the view-point position is set at an estimated position of the driver's eyes inside the vehicle room, as illustrated in FIG. 7. The sight direction of the driver's view point VPd can be set to be a forward and obliquely-downward direction in such a way as to include the vicinity of the front wheels, for example. The "obliquely-downward direction" can be assumed to be a direction downward by about 20 to 30 degrees with respect to a vehicle horizontal plane, for example. The sight direction of the driver's view point VPd may be made changeable to an arbitrary direction, based on user's manipulations (for example, swiping) on the touch panel 4, while the forward-and-obliquely-downward direction is defined as a default direction.

As the estimated position of the driver's eyes, it is possible to employ an eyellipse, which is defined for every type of vehicle. Such an eyellipse is a virtual spatial region defined for every type of vehicle and is set to have a virtual elliptical shape, based on an eye range which statically expresses a special distribution of eye points of occupants (refer to JISD0021: 1998). The estimated position of the driver's eyes is set near the head rest of the driver's seat, for example. The driver's view point VPd corresponds to an example of a vehicle-inside view point, wherein the virtual view point VP is placed inside the vehicle room. The position of the driver's view point VPd may be also placed at a position deviated from the estimated position of the driver's eyes. For example, the driver's view point VPd may be also placed at a position deviated from the estimated position of the driver's eyes by a predetermined amount toward the assistant driver's seat, such as at a position between the driver's seat and the assistant driver's seat.

Changing over the view point for forming a synthetic image CP corresponds to changing over the display mode for the synthetic image CP. For convenience, states where the bird's-eye view point VPb is employed are referred to as a bird's-eye view point mode. States where the driver's view point VPd is employed are referred to as a driver's view point mode.

The image synthesizing unit F7 is structured to perform image processing for forming a synthetic image CP. The image synthesizing unit F7 projects data of a plurality of camera images on a virtual projection surface corresponding to the periphery of one's subject vehicle. Further, the image synthesizing unit F7 forms a synthetic image CP showing the periphery of one's subject vehicle which is viewed from a virtual view point VP, using the data on this projection surface. The display control unit F6 controls the operation of the image synthesizing unit F7. For example, the display control unit F6 controls the projection surface and the virtual view point VP to be used for forming a synthetic image CP. More specifically, the image synthesizing unit F7 forms a synthetic image CP by selectively using one of the plurality of projection surfaces having respective different shapes, by being controlled by the display control unit F6. The procedure for forming a synthetic image CP will be described later, in more detail.

The display-image formation unit F8 forms a displayed image DP to be displayed on the display 3. The display-image formation unit F8 forms a displayed image DP including a synthetic image CP and a camera image, using the synthetic image CP formed by the image synthesizing unit F7 and the camera image acquired by the image acquisition unit F1. The display control unit F6 determines the combination of images included in the displayed image DP, according to the direction of travelling of one's subject vehicle and user's manipulations on the touch panel 4 and the like. Namely, the display control unit F6 controls the operation of the display-image formation unit F8. Operations of the display-image formation unit F8 and the display control unit F6 for forming a displayed image DP will be described later separately.

The image output unit F9 convers the displayed image DP formed by the display-image formation unit F8 into picture signals of a predetermined signal format and, then, outputs the picture signals to the display 3, thereby causing the display 3 to display the displayed image DP. Thus, a synthetic image CP showing the periphery of one's subject vehicle which is viewed from the virtual view point VP is displayed on the display 3.

<Regarding the Normal Projection Surface>

Figure 8:
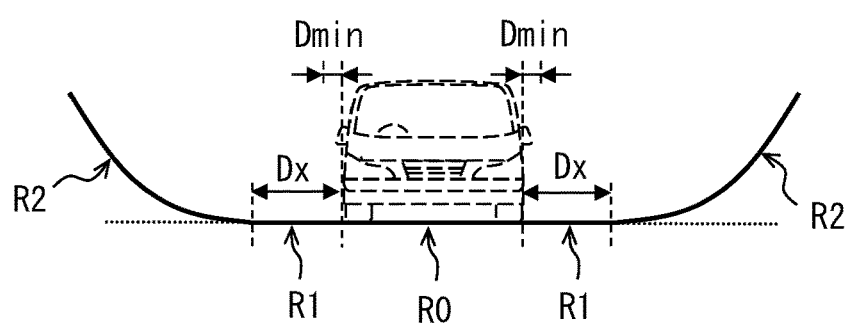
FIG. 8 is a view for explaining the shape of a normal projection surface TS1.
Figure 9:
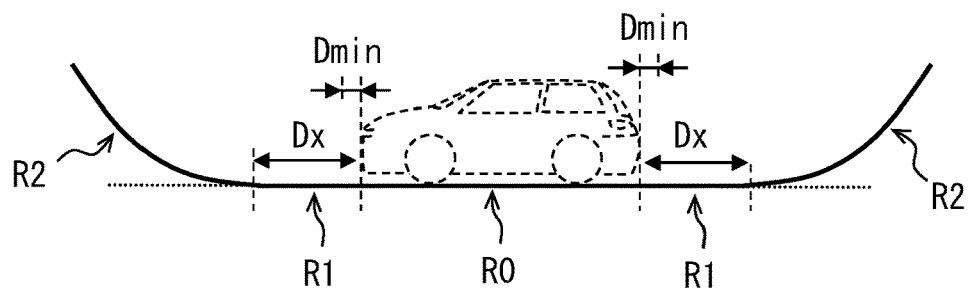
FIG. 9 is a view for explaining the shape of the normal projection surface TS1.

Hereinafter, there will be described the normal projection surface TS1 for use in forming a synthetic image CP. The normal projection surface TS1 has a bowl shape having a downwardly-convex curved surface. FIG. 8 is a view illustrating a cross section of the normal projection surface TS1 along the leftward-and-rightward direction of one's subject vehicle. FIG. 9 is a view illustrating a cross section of the normal projection surface TS1 along the forward-and-rearward direction of one's subject vehicle. As illustrated in the figures, the normal projection surface TS1 generally has a shape which has a flat surface formed along a vehicle horizontal direction near the vehicle region R0 and, also, has larger inclinations (gradients) at larger distances from the vehicle region R0. In the present specification, the term "inclination" of the projection surface TS denotes the length in the vertical direction with respect to a unit length in the vehicle horizontal direction. The "inclination" at each position on the projection surface TS can be also said to be the inclination of a tangential line at this position.

The normal projection surface TS1 can be partitioned into the vehicle region R0 having a flat-surface shape which corresponds to the road-surface region in which one's subject vehicle resides, a flat-surface region R1 which forms a flat surface continuous with the vehicle region R0, and a curved-surface region R2 forming a downwardly-convex curved surface which is spaced apart from the vehicle region R0. The flat-surface region R1 corresponds to an on-road flat-surface region, and the curved-surface region R2 corresponds to an on-road curved-surface region.

The normal projection surface TS1 as described above can be said to have the flat-surface region R1 having relatively-smaller inclinations and being at a relatively-larger distance from the vehicle region R0, and the curved-surface region R2 having relatively-larger inclinations and being at a relatively-larger distance from the vehicle region R0. The vehicle region R0 corresponds to a region which overlaps with one's subject vehicle in a top view.

The flat-surface region R1 is adjacent to the vehicle region R0 and is placed to surround the periphery of the vehicle region R0. The curved-surface region R2 is placed outside the flat-surface region R1. This structure of the normal projection surface TS1 corresponds to a structure which provides the flat-surface region R1 interposed between the vehicle region R0 and the curved-surface region R2, from another standpoint. The flat-surface region R1 is extended from the edge portion of the vehicle region R0 at least up to a point spaced apart therefrom by a predetermined minimum flat-surface distance Dmin or more in the vehicle horizontal direction. In other words, a region from the vehicle region R0 at least up to the position spaced apart therefrom by the minimum flat-surface distance Dmin or less is made to be the flat-surface region R1. The minimum flat-surface distance Dmin can be 0.3 m, 0.5 m, or 1 m, for example. A flat-surface formation distance D1, which is the distance from the edge portion of the vehicle region R0 to the border between the flat-surface region R1 and the curved-surface region R2, is set to be the minimum flat-surface distance Dmin or more. The flat-surface formation distance D1 can be set to be 1.5 m, for example. The flat-surface formation distance D1 may be different in dimension between in the forward-and-rearward direction and in the leftward-and-rightward direction. For example, the flat-surface formation distance D1 in the forward-and-rearward direction may be set to be larger than the flat-surface formation distance D1 in the leftward-and-rightward direction, by about 0.25 to 0.5 m.

The curved-surface region R2 is formed outside the flat-surface region R1, namely at the peripheral edge portion of the normal projection surface TS1. Further, the curved-surface region R2 has a shape with a gradually-increasing inclination. For example, the curved-surface region R2 can be made to have a shape similar to a quadratic curve, in other words, a parabolic shape. Therefore, the shape of the curved-surface region R2 can be defined by a coefficient parameter of a quadratic curve. For example, the cross-sectional shape of the curved-surface region R2 included in the normal projection surface TS1 can be expressed, as in the following formula (2), using a coefficient "a1", assuming that an origin point is at the outer edge portion of the flat-surface region R1, the x axis is in the vehicle horizontal direction, and the z axis is in the vehicle hightwise direction. It is assumed that the x-axis positive direction is the direction which gets farther away from the vehicle region R0.

$$z = a1 \cdot x\textasciicircum 2 \qquad (1)$$

The coefficient "a1" is a parameter defining the degree of inclination of the curved-surface region R2 and can be also referred to as an inclination coefficient. "a1" can be properly designed in magnitude. Namely, as the coefficient "a1" is made larger, the inclination of the curved-surface region R2 is made larger. As a matter of course, the model of the curved-surface region R2 is not limited to a quadratic curve and may be also an arc shape, a logarithmic function, or an exponential function.

In this case, as an example, data of camera images is not projected on the vehicle region R0, and data of camera images is projected on the regions outside the vehicle region R0. Namely, the vehicle region R0 corresponds to a non-projection region on which no camera image is projected. Hereinafter, the regions on which data of camera images is projected (the regions outside the vehicle region R0), in the various projection surfaces TS, will be also referred to as "projection-subject regions". In the normal projection surface TS1, the flat-surface region R1 and the curved-surface region R2 correspond to the projection-subject regions.

The normal projection surface TS1 includes a forward region PF which is a region corresponding to the forward of one's subject vehicle, a rearward region PB which is a region corresponding to the rearward thereof, a left-side region PL which is a region corresponding to the left thereof, and a right-side region PR which is a region corresponding to the right thereof. The forward region PF is a region on which an image SF from the front camera 2F is projected. The rearward region PB is a region on which an image SB from the rear camera 2B is projected. The left-side region PL is a region on which an image SL from the left-side camera 2L is projected. The right-side region PR is a region on which an image SR from the right-side camera 2R is projected. The flat-surface region R1 is included in the respective regions PF, PB, PL and PR in the normal projection surface TS1. Each position in the projection-subject regions in the normal projection surface TS is associated with one of the four camera images SF, SB, SL and SR, through correspondence information such as a table data.

<Regarding the Off-Road Projection Surface>

Next, with reference to FIGS. 10 and 11, the off-road projection surface TS2 will be described. The off-road projection surface TS2 is a projection surface TS for forming a synthetic image CP, similarly to the normal projection surface TS1, and corresponds to a 3D-model surface on which respective camera images are projected (in other words, texture mapping is performed).

Figure 10:
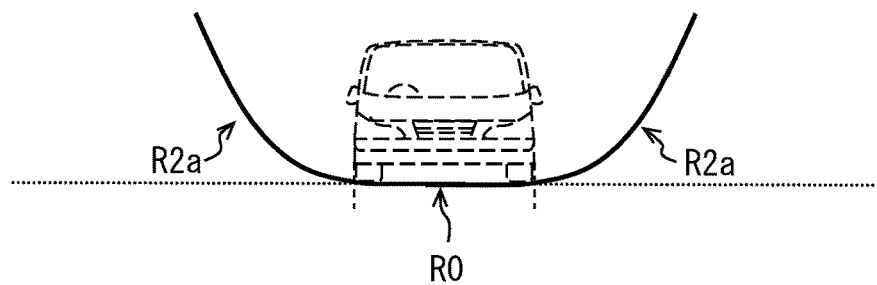
FIG. 10 is a view for explaining the shape of an off-road projection surface TS2.
Figure 11:
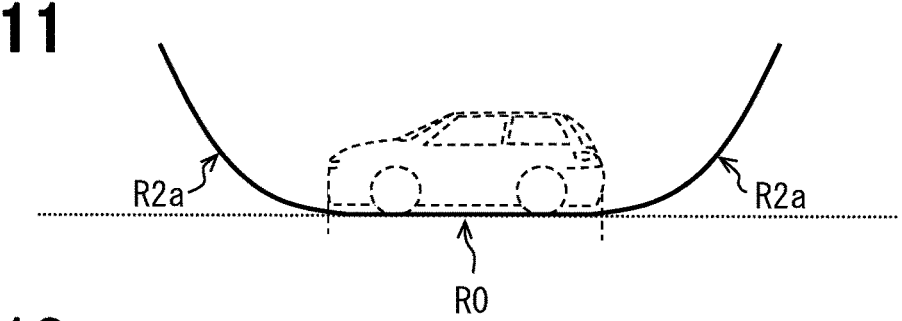
FIG. 11 is a view for explaining the shape of the off-road projection surface TS2.

FIG. 10 is a view illustrating a cross section of the off-road projection surface TS2 along the leftward-and-rightward direction of one's subject vehicle. FIG. 11 is a view illustrating a cross section of the off-road projection surface TS2 along the forward-and-rearward direction of one's subject vehicle. As illustrated in FIGS. 10 and 11, the off-road projection surface TS2 generally has a bowl shape having a downwardly-convex curved surface. This off-road projection surface TS2 can be partitioned into a vehicle region R0 in which one's subject vehicle resides, and a curved-surface region R2a which surrounds the periphery of the vehicle region R0 and has a downwardly-convex curved-surface shape. Namely, the off-road projection surface TS2 according to the present embodiment includes no flat-surface region, between the vehicle region R0 and the curved-surface region R2a. The curved-surface region R2a corresponds to an off-road curved-surface region.

The curved-surface region R2a is formed in such a way as to be coupled with the edge portion of the vehicle region R0. In the off-road projection surface TS2 according to the present embodiment, only the curved-surface region R2a corresponds to the projection-subject region. The curved-surface region R2a includes a region as a forward region PF opposing to the front surface of one's subject vehicle, a region as a rearward region PB opposing to the rear surface portion of one's subject vehicle, a region as a left-side region PL opposing to the left side surface thereof, and a region as a right-side region PR opposing to the right side surface thereof.

The curved-surface region R2a is formed to be a curved surface which has smaller inclinations at positions closer to the vehicle region R0 and has larger inclinations at positions farther from the vehicle region R0. Namely, the curved-surface region R2a has a shape having an inclination which gradually increases in the vehicle horizontal direction. For example, the shape of a cross section of the curved-surface region R2a can be expressed, as in the following formula (2), assuming that an origin point is at the edge portion of the vehicle region R0, the x axis is in the vehicle horizontal direction, and the z axis is in the vehicle hightwise direction.

$$z = a2 \cdot x^{\wedge}2 \qquad (2)$$

The "a2" is a coefficient and defines the magnitude of the inclination of the curved-surface region R2a. The coefficient "a2" can be also referred to as an inclination coefficient. As the coefficient "a2" is made larger, the inclination of the curved-surface region R2a is made larger. The coefficient "a2" is set to have a value larger than that of the aforementioned coefficient "a1". Namely, the curved-surface region R2a included in the off-road projection surface TS2 is formed to have a steeper inclination than that of the curved-surface region R2 which forms the normal projection surface TS1. For example, the inclination of the curved-surface region R2a included in the off-road projection surface TS2 is set to be equal to or more than 1.5 times the inclination of the curved-surface region R2 which forms the normal projection surface TS1. For example, the inclination of the curved-surface region R2a is set in such a way as to satisfy the relationship of a2≥1.5·a1.

The curved-surface region R2a in the off-road projection surface TS2 may be different in inclination between in the regions PL and PR opposing to the side surfaces of one's subject vehicle, and in the regions PF and PB opposing to the front and rear surfaces of one's subject vehicle. For example, the forward region PF and the rearward region PB may be made to have an inclination larger than that of the left-side and right-side regions. The coefficient "a2" in the vehicle directly-frontward direction and in the vehicle rearward direction may be set to be equal to or more than 1.2 times the coefficient "a2" in the vehicle rightward direction and in the vehicle leftward direction. Between the portions having different inclinations in the curved-surface region R2a, the inclination is gradually changed.

Although, in the present embodiment, there has been employed an aspect where the curved-surface region R2a has a downwardly-convex parabolic shape, the present disclosure is not limited thereto, as a matter of course. The model of the curved-surface region R2a is not limited to a quadratic curve and may be also an arc shape, a logarithmic function, or an exponential function.

<Regarding a Method for Forming a Synthetic Image>

Hereinafter, there will be described a methodology for causing the image synthesizing unit F7 to form a synthetic image CP showing the state of the periphery of one's subject vehicle, which is viewed from the virtual view point VP. Hereinafter, a method for forming a synthetic image CP will be described, by exemplifying a case of employing the normal projection surface TS1 as the projection surface TS. The same can be applied to cases of employing the off-road projection surface TS2 as the projection surface TS.

In forming a synthetic image CP, at first, the image synthesizing unit F7 projects data (the values of respective pixels) included in four camera images SF, SB, SL and SR which have been inputted from the image acquisition unit F1, onto the normal projection surface TS1 in a virtual 3D space. The respective camera images and the positions at which the respective camera images is projected onto the normal projection surface TS1 have been preliminarily associated with each other, with correspondence information such as a table data. The image synthesizing unit F7 projects the data of the four camera images SF, SB, SL and SR, onto the respective corresponding regions in the normal projection surface TS1 More specifically, the image synthesizing unit F7 projects the data of the camera image SF from the front camera 2F onto the forward region PF in the normal projection surface TS1. Further, the image synthesizing unit F7 projects the data of the camera image SB from the rear camera 2B onto the rearward region PB in the normal projection Surface TS1. Further, the image synthesizing unit F7 projects the data of the camera image SL from the left-side camera 2L onto the left-side region PL in the normal projection surface TS1 and, further, projects the data of the camera image SR from the right-side camera 2R onto the right-side region PR.

The portions of the camera images which jut out from the projection-subject regions can be eliminated. For overlapping regions, which are regions photographed redundantly by two cameras, it is possible to employ a methodology for blending images captured by two cameras at a predetermined ratio, or a methodology for coupling images captured by two cameras with each other at a predetermined border line.

After the projection of the data of the corresponding camera images on the respective portions of the normal projection surface TS1, next, the image synthesizing unit F7 forms a one's-own-vehicle image Pv which is a 3D model of one's subject vehicle. The storage 13 may preliminarily store data for drawing the one's-own-vehicle image Pv, as an image-drawing data. The one's-own-vehicle image Pv is placed on the vehicle region R0.

Next, the image synthesizing unit F7 sets a virtual view point VP, in a 3D space including the normal projection surface TS1, by being controlled by the display control unit F6. The image synthesizing unit F7 can set the virtual view point VP oriented in an arbitrary field-of-view direction, at an arbitrary view-point position in the 3D space. Further, the image synthesizing unit F7 cuts out the data projected on a region included in a predetermined viewing angle when viewed from the set virtual view point VP, as an image, out of the normal projection surface TS1. Further, the image synthesizing unit F7 performs rendering corresponding to the set virtual view point VP, on the one's-own-vehicle image Pv. Then, the image synthesizing unit F7 superimposes a two-dimensional one's-own-vehicle image Pv resulted from the rendering, on the cut-out image. Thus, the image synthesizing unit F7 forms a synthetic image CP showing one's subject vehicle and a region at the periphery of one's subject vehicle which are viewed from the virtual view point VP.

Figure 12:
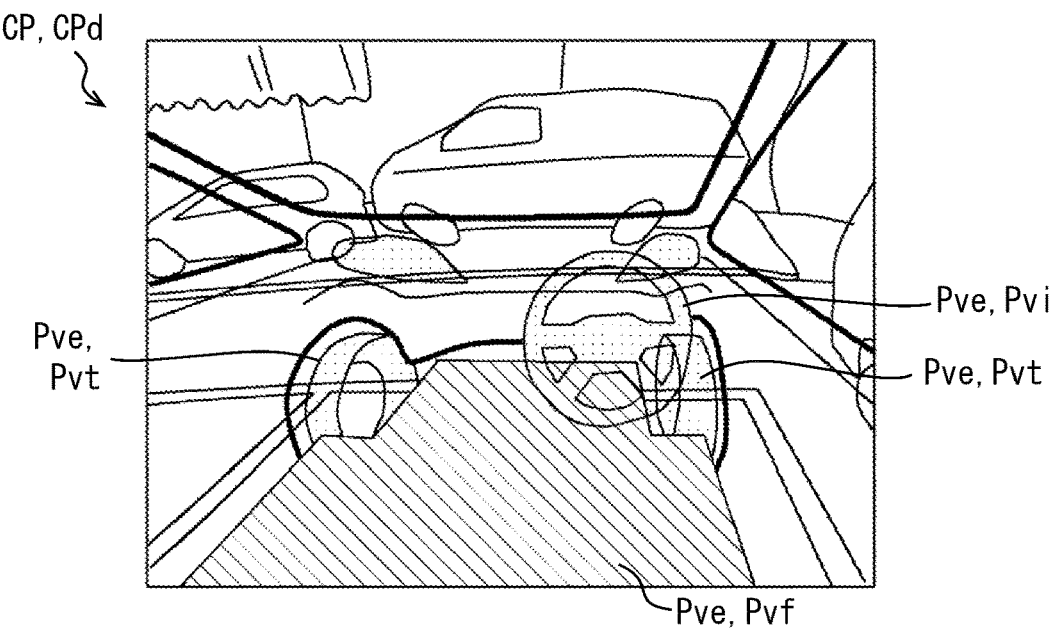
FIG. 12 is a view illustrating an example of a driver's view-point image CPd.

For example, when the position and the like of the virtual view point VP are set to be those of the driver's view point VPd, as illustrated in FIG. 12, the image synthesizing unit F7 forms a driver's view-point image CPd showing the forward of the vehicle, in such a way as to pass transparently through the instrument panel and the like. The driver's view-point image CPd corresponds to an image formed by superimposing constituent-member images Pve showing constituent members of one's subject vehicle which are viewed from the driver's view point VPd, on an image of a photographed object existing forward of the vehicle which is viewed from the driver. By recognizing this driver's view-point image CPd, the user can recognize the state of the periphery of one's subject vehicle from the view point inside the vehicle room and, further, can intuitively understand the state of the periphery of one's subject vehicle. Further, the user can intuitively understand in which direction out of the periphery of one's subject vehicle the driver's view-point image CPd shows, based on the constituent-member images Pve included in the driver's view-point image CPd.

The constituent-member images Pve include a floor image Pvf, a tire image Pvt, and interior images Pvi, for example. The floor image Pvf, which is an image showing a region in which the vehicle-body bottom portion exists, is set to be non-transparent, for example. The tire image Pvt, which is an image drawn using a 3D model of the tires, is set to be untransparent or semi-transparent. The tire image Pvt may be also an image of only an untransparent or semi-transparent contour line. In the tire image Pvt, the inside of the contour line may be made colorless and transparent. In addition, the synthetic image CP may include a frame line image indicating the road-surface regions in which the tires exist, instead of or in parallel with the tire image Pvt. The interior images Pvi are images showing an instrument panel, a handle, an A pillar and the like. The interior images Pvi are also made transparent or semi-transparent, in its regions other than the contour portions. In addition, the contour lines in the interior images Pvi may be also made semi-transparent. In addition, it is not necessary to display the interior images Pvi. Although FIG. 12 illustrates an aspect where the handle, the A pillar and the head light are displayed, it is not necessary to display images indicating the positions of these members. It is possible to properly change the elements included in the constituent-member images Pve.

As described above, in the synthetic image CP, constituent elements which are less required to be displayed for allowing the driver to recognize the positional relationship between the vehicle V and peripheral objects therearound are underplayed or displayed only by contour lines. In other words, the constituent-member images Pve included in the synthetic image CP are adjusted, such that the number thereof is made as small as possible. With this structure, it is possible to suppress the degradation of the visibility to the vehicle periphery.

Figure 13:
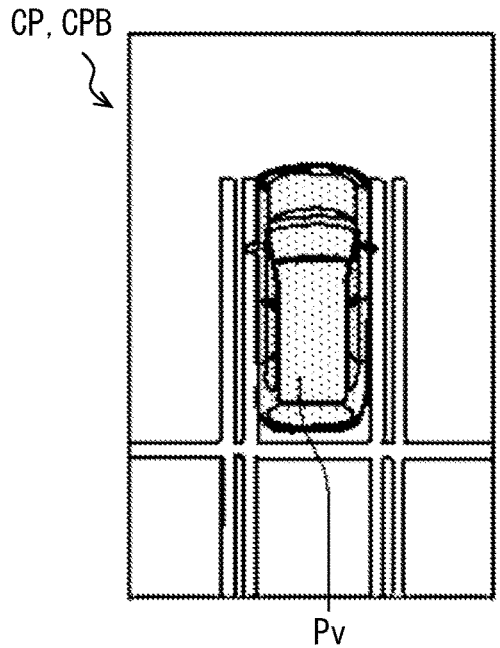
FIG. 13 is a view illustrating an example of a bird's-eye image CPb.

Besides, when the position and the like of the virtual view point VP are set to be those of the bird's-eye view point VPb, the image synthesizing unit F7 forms a bird's-eye image CPb, which is a synthetic image CP of one's subject vehicle and a peripheral region therearound, which are overviewed from thereabove, as illustrated in FIG. 13.

The initial state of the position and the sight direction of the virtual view point VP in the synthetic image CP are determined, based on at least one of the direction of travelling of one's subject vehicle, setting made preliminarily by the user, and the steering angle. Further, the position and the sight direction of the virtual view point VP in the synthetic image CP can be changed, based on user's manipulations on the touch panel and the like. The image synthesizing unit F7 according to the present embodiment is structured to mainly employ the driver's view point VPd. Namely, the image synthesizing unit F7 is structured to form a driver's view-point image CPd, which is a synthetic image CP taken along the driver's line of sight in such a way as to transparently pass through the structure of the vehicle, as a synthetic image CP to be formed at first when a display-start condition which will be described later has been satisfied.

<Flow of Operations>

Figure 14:
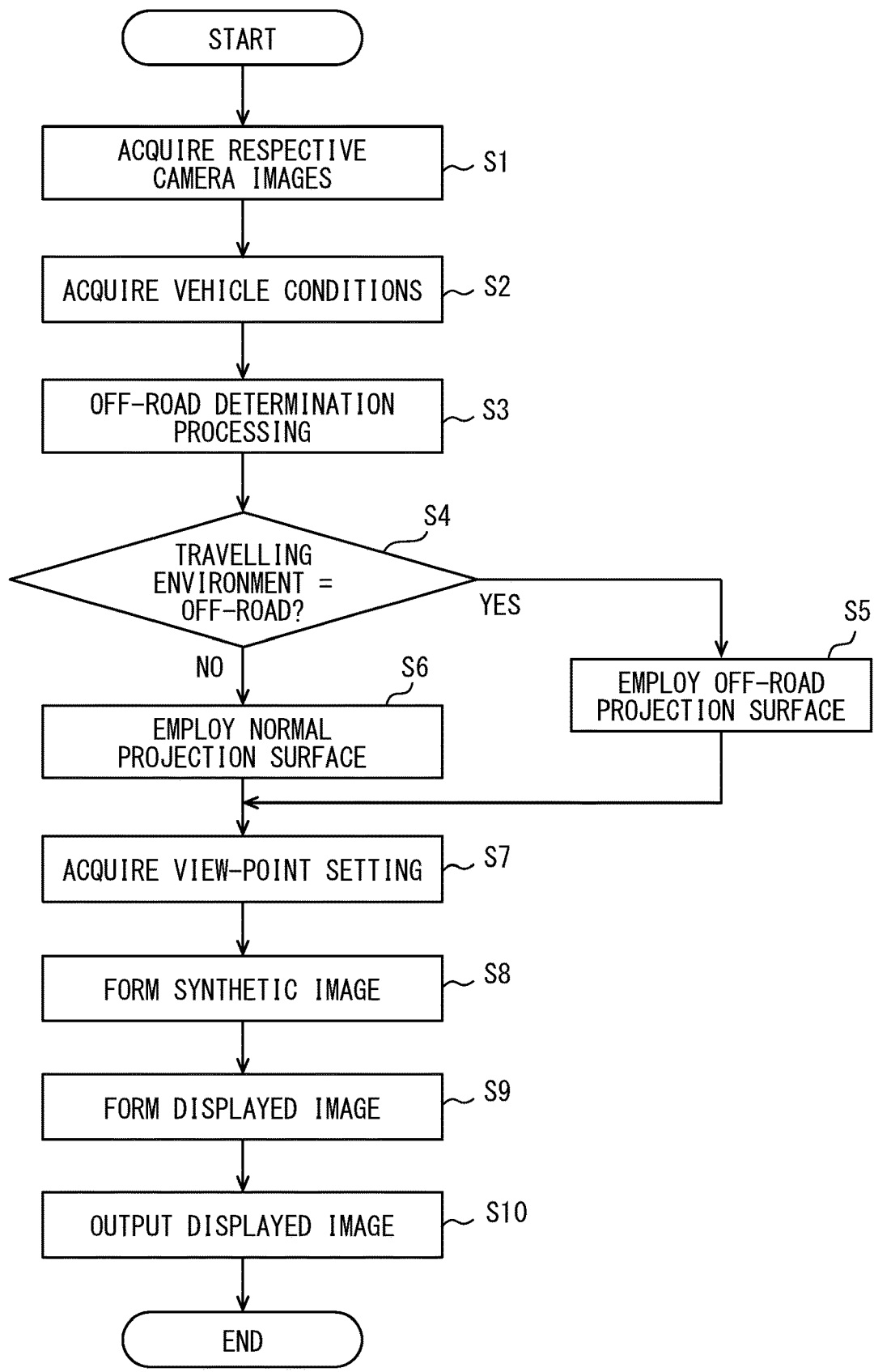
FIG. 14 is a flow chart of synthetic image display processing.

With reference to a flow chart illustrated in FIG. 14, there will be described the flow of synthetic image display processing, which is a series of processing which the image formation ECU 1 executes for displaying a synthetic image CP. The flow chart illustrated in FIG. 14 is started, if a predetermined display start condition is satisfied. The display start condition can be understood to be a condition required for displaying a synthetic image CP, in other words, a condition required for starting the present flow. For example, the image formation ECU 1 determines that the display start condition has been satisfied, if the user pushes the display changeover switch 51. Besides, the image formation ECU 1 may determine that the display start condition has been satisfied, if it is detected that the user has performed a predetermined manipulation for displaying a synthetic image CP through the touch panel 4. Namely, the present flow can be started, based on the fact that the manipulation reception unit F2 has acquired a signal indicating that a manipulation for displaying a synthetic image CP has been performed.

The display start condition may be constituted by items which include items regarding the shift position, the vehicle speed and the like. For example, the display start condition may include at least one of that the shift position is set within a predetermined range, and that the vehicle speed is lower than a predetermined threshold value. Also, the present flow may be started, if a view-point changeover manipulation is received, in a state where a front-camera image SF or a rear-camera image SB is displayed.

The processing flow illustrated in FIG. 14 can be repeatedly executed, at a predetermined cycle (for example, a cycle of ⅓₀ second), until a predetermined display cancelling condition is satisfied. The display cancelling condition may be, for example, that the display changeover switch 51 has been pushed again, that the shift position has been set outside a predetermined range, or that the vehicle speed has come to be equal to or more than a predetermined threshold value, and the like. Besides, the image formation ECU 1 may determine that the display cancelling condition has been satisfied, if it is detected that a manipulation for ending the display of a synthetic image CP has been performed through the touch panel 4.

In this case, as an example, the synthetic image display processing includes steps S1 to S10. As a matter of course, the number of steps constituting the synthetic-image display processing, and the order of processing therein can be changed as required.

At first, in a step S1, the image acquisition unit F1 acquires four camera images SF, SB, SL and SR captured by the four cameras 2, and the processing shifts to a step S2. The step S1 can be referred to as an image acquisition step. In the step S2, the vehicle-condition acquisition unit F3 acquires information indicating the condition of one's subject vehicle, such as the shift position, the vehicle speed and the like, and the processing shifts to a step S3. The step S2 can be referred to as a vehicle-condition acquisition step.

In the step S3, the travelling-environment determination unit F62 determines whether or not the travelling environment corresponds to an off-road, based on signals from the travelling-mode switch 52, for example. As a matter of course, as the method for determining that the travelling environment is an off-road, it is possible to employ various methods. The step S3 can be referred to as a travelling-environment determination step. In this case, if the travelling-environment determination unit F62 determines that the travelling environment is an off-road, a step S4 results in positive determination, and the processing shifts to a step S5. On the other hand, if it is determined that the travelling environment is an on-road, the step S4 results in negative determination, and a step S6 is executed.

In the step S5, the display control unit F6 as the projection-surface control unit F63 outputs, to the image synthesizing unit F7, a signal for commanding it to use the off-road projection surface TS2 as the projection surface TS used in forming a synthetic image CP. The image synthesizing unit F7 acquires the shape of the off-road projection surface TS2, by reading out the projection-surface data Dt corresponding to the off-road projection surface TS2 from the storage 13, based on the command from the display control unit F6. Thus, the off-road projection surface TS2 is employed for the image synthesizing processing. This step S5 can be referred to as an off-road projection surface employing step for causing the image synthesizing unit F7 to select the off-road projection surface TS2 as the projection surface TS, by being controlled by the display control unit F6. After the completion of the processing in the step S5, the processing shifts to a step S7.

In the step S6, the display control unit F6 as the projection-surface control unit F63 outputs, to the image synthesizing unit F7, a signal for commanding it to use the normal projection surface TS1 as the projection surface TS used in forming a synthetic image CP. Thus, the normal projection surface TS1 is employed for the image synthesizing processing. This step S6 can be referred to as a normal projection surface employing step for causing the image synthesizing unit F7 to select the normal projection surface TS1 as the projection surface TS, by being controlled by the display control unit F6. After the completion of the processing in the step S6, the processing shifts to the step S7. This series of the processing in the steps S4 to S6 can be referred to as a projection-surface selection step for changing over the projection surface TS for use in forming a synthetic image CP, based on the result of determination by the travelling-environment determination unit F62.

In the step S7, the view-point control unit F64 determines the virtual view point VP for forming a synthetic image CP. When a synthetic image CP is displayed at first after a travelling power source is turned on, the setting of the virtual view point VP can be a position and a sight direction which have been preliminarily set as a default setting by the user or the designer. The default setting can be the driver's view point VPd having a sight direction oriented forward and obliquely downward, for example. Besides, the setting of the virtual view point VP which is read out in the step S7 can be the position and the direction of the virtual view point VP which is displayed by the driver at the previous time. In this case, the display control unit F6 is structured to store data about the setting of the virtual view point VP of when a synthetic image CP is displayed at the previous time, in the storage 13 and the like, as a preparation processing.

The position and the sight direction of the virtual view point VP may be also determined, depending on the direction of travelling of one's subject vehicle. For example, if the direction of travelling of one's subject vehicle which has been acquired by the travelling-direction acquisition unit F61 is the forward direction, the driver's view point VPd having a sight direction oriented forward and obliquely downward as described above is employed as the virtual view point VP. On the other hand, if the direction of travelling of one's subject vehicle which has been acquired by the travelling-direction acquisition unit F61 is the rearward direction, a driver's view point VPd having a sight direction oriented rearward and obliquely downward may be employed as the virtual view point VP for forming a synthetic image CP, for example. Besides, the sight direction of the virtual view point VP may be also adjusted to be a direction according to the steering angle. The view-point control unit F64 may also acquire the position and the direction of the virtual view point VP which have been specified by the user through the touch panel 4 and the like and, further, may set the virtual view point VP being at the specified position and having the specified direction.

Information about the setting of the virtual view point VP which has been determined in the step S7 is outputted to the image synthesizing unit F7. In this case, as an example, it is assumed that the driver's view point VPd having a sight direction oriented forward and obliquely downward is employed, as the virtual view point VP. This step S7 can be referred to as a virtual-view-point setting step. After the completion of the step S7, the processing shifts to a step S8.

In the step S8, the image synthesizing unit F7 forms a synthetic image CP taken from the virtual view point VP set in the step S7, using the projection surface TS according to the result of determination by the travelling-environment determination unit F62. Namely, the image synthesizing unit F7 forms a driver's view-point image CPd showing the ground surface forward of the vehicle, which is taken from the driver's view point VPd, in this case.

For example, when the normal projection surface TS1 is employed, the image synthesizing unit F7 projects data of respective camera images onto the projection-subject regions including the flat-surface region R1 in the normal projection surface TS1. Further, the image synthesizing unit F7 forms a driver's view-point image CPd, using the data on the normal projection surface TS1 on which the various camera images have been projected. Further, when the off-road projection surface TS2 is employed, the image synthesizing unit F7 projects data of respective camera images onto the curved-surface region R2a as the projection-subject region in the off-road projection surface TS2. Further, the image synthesizing unit F7 forms a driver's view-point image CPd, using the data on the off-road projection surface TS2 on which the respective camera images have been texture-mapped. The data of the synthetic image CP formed by the image synthesizing unit F7 is outputted to the display-image formation unit F8. This step S8 can be referred to as a synthetic-image formation step. After the completion of the processing in the step S8, the processing shifts to a step S9.

Figure 15:
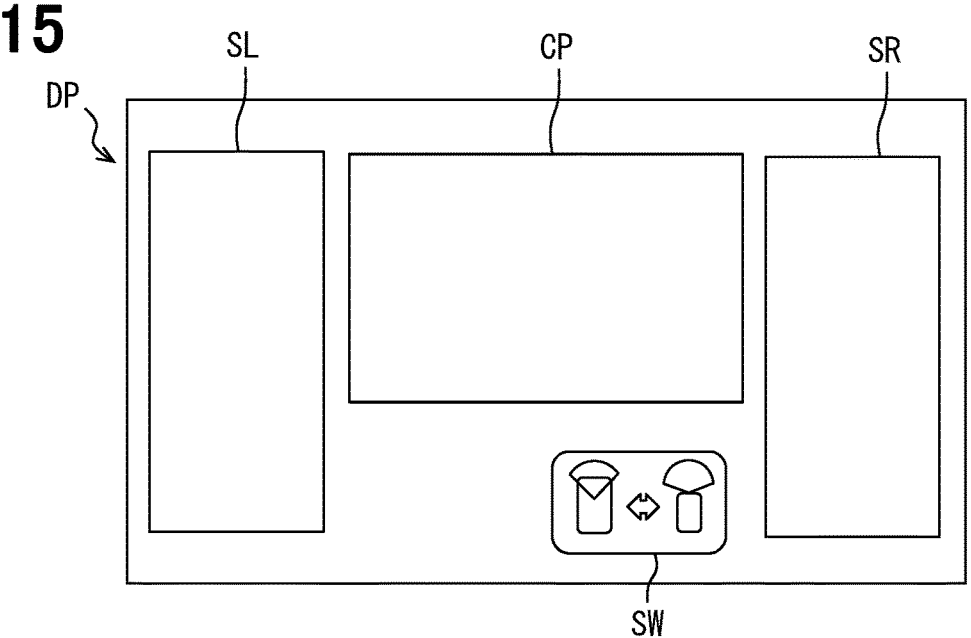
FIG. 15 is a view illustrating an example of the layout of a displayed image DP.

In the step S9, the display-image formation unit F8 forms a displayed image DP to be displayed on the display 3, using the synthetic image CP formed by the image synthesizing unit F7. For example, the display-image formation unit F8 forms an image including a driver's view-point image CPd as a synthetic image CP, a right-side camera image SR, a left-side camera image SL, and a view-point changeover switch image SW, as a displayed image DP, as illustrated in FIG. 15. More specifically, the driver's view-point image CPd is placed in an upper side in a center region in the displayed image DP, and the view-point changeover switch image SW is placed thereunder. The right-side camera image SR is placed to the right of the driver's view-point image CPd, and the left-side camera image SL is placed to the left of the driver's view-point image CPd. With this layout of the displayed image DP, it is possible to visually notify the driver of the left and right situations, while maintaining preferable visibility of the driver's view-point image CPd for the user. Namely, the driver is allowed to recognize the state of the ground surface near the front wheels and the vehicle front end and, further, to recognize the situation of regions around the sides of the vehicle, at the same time, by viewing the aforementioned displayed image DP.

The view-point changeover switch image SW included in the displayed image DP is an image which functions as a switch for changing over the display content as the displayed image DP, by being touched by the user. It can be determined as to whether or not the user has touched the view-point changeover switch image SW, based on touched-position signals outputted from the touch panel 4. If a user's touching manipulation on the view-point changeover switch image SW is detected, the display-image formation unit F8 changes over the image displayed in the image center region from the driver's view-point image CPd to the front-camera image SF, by being commanded by the display control unit F6, for example. The view-point changeover switch image SW may be also configured to change over the virtual view point VP from the driver's view point VPd to the bird's-eye view point VPb. In this case, the display-image formation unit F8 forms an image including a bird's-eye image CPb as a displayed image DP, for example. Data of the displayed image DP formed by the display-image formation unit F8 is outputted to the image output unit F9. The step S9 can be referred to as a display-image formation step.

In a step S10, the image output unit F9 coverts the digital data of the displayed image DP formed by the display-image formation unit F8 into signals of a predetermined signal format and, then, outputs the signals to the display 3. Thus, the displayed image DP including the driver's view-point image CPd is displayed on the display 3. The step S10 can be referred to as an image output step.

The aforementioned aspect of control is merely an example, and the display-image formation unit F8 can select a camera image according to the direction of travelling of one's subject vehicle and can use it for forming a displayed image DP, by being controlled by the display control unit F6. For example, when the direction of travelling is a rearward-travelling direction, a rear-camera image SB may be placed, at the center region in the displayed image DP. The display control unit F6 can also change the combination of images displayed in the displayed image DP, the layout thereof, the ranges in which camera images are displayed, and the like, based on manipulation signals received by the manipulation reception unit F2.

<Effects of Changeover of the Projection Surface>

Hereinafter, there will be described effects of changing over the projection surface TS for use in forming a synthetic image from the normal projection surface TS1 to the off-road projection surface TS2, when the travelling environment is an off-road. As a premise, on an off-road, there are continuously a plurality of stereoscopic objects such as rocks and geographic level differences, in the periphery of the vehicle, in comparison with cases where one's subject vehicle is existing on an on-road. Further, on an off-road, the ground surface itself is not flat, in many cases. Therefore, when the travelling environment is an off-road, it is important to display such rocks, stones and geographic features, without degrading the stereoscopic effect and the realism thereof.

Figure 16:
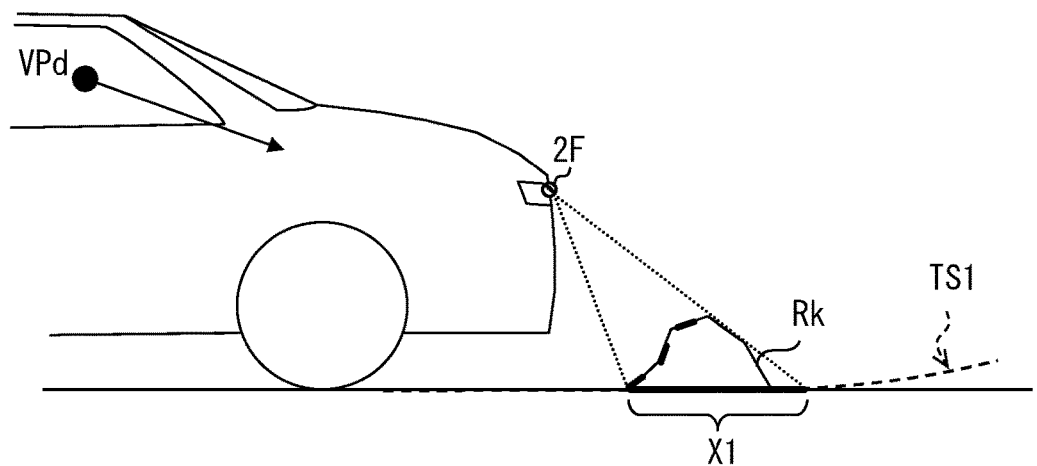
FIG. 16 is a view for explaining the way in which a rock Rk is viewed, in a case of employing the normal projection surface TS1.

FIG. 16 is a view for explaining the position at which an image of a rock Rk existing near one's subject vehicle is projected, in a case of employing the normal projection surface TS1 for forming a synthetic image CP. The rock Rk, which is a rock existing at a position relatively close to one's subject vehicle, represents a rock existing within the flat-surface region R1 in the normal projection surface TS1, namely at the flat-surface formation distance D1 or less from one's subject vehicle. In this case, the term "rock" denotes a stone with a size of equal to or more than 20 cm, for example.

An image of the rock Rk, which can be obtained by photographing the rock Rk by a camera 2 (for example, the front camera 2F), is projected on the position at which a straight line connecting the position of this camera 2 and the position of the rock Rk to each other is intersected with the normal projection surface TS1. Since the rock Rk exists near one's subject vehicle, the image of the rock Rk is projected onto the flat-surface region R1 in the normal projection surface TS1. In the figure, "X1" indicates the range in which the image of the rock Rk is projected, in the normal projection surface TS1. The broken lines drawn on the rock Rk indicate the surface portion photographed by the front camera 2F. As illustrated in FIG. 16, out of the surface of the rock Rk, the portion photographed by the front camera 2F exists at a position higher than the horizontal plane in which the flat-surface region R1 resides. Therefore, the image of the rock Rk is projected on the flat-surface region R1, in a form of being stretched more deeply (in other sides, more outwardly) than the actual position.

Therefore, in a synthetic image CP of the normal projection surface TS1 viewed from the driver's view point VPd, the image of the rock Rk is such that the rock near one's subject vehicle is shown more largely than the actual size, having a flat-surface shape with a degraded stereoscopic effect. This phenomenon is also induced in stereoscopic objects such as other rocks and stones which exist within the flat-surface region R1. In addition, in an off-road environment, the driver tends to gaze a portion closer to the vehicle V, out of the driver's view-point image CPd, in order to perform manipulations for placing the tires on a targeted rocky place or for avoiding a larger rock which can damage the body. As a result thereof, when the user views the driver's view-point image CPd using the normal projection surface TS1, the user may feel as if the periphery of one's subject vehicle is flat. Further, the user tends to have an impression that stereoscopic objects are displayed, in a form of being crushed.

As a matter of course, when the travelling environment of one's subject vehicle is an on-road, namely one's subject vehicle exists on a flat road, the use of the normal projection surface TS1 gives the user visual impression consistent with the actual ground-surface shape. Therefore, when one's subject vehicle" exists on an on-road, it is said that the normal projection surface TS1 has a preferable shape as the projection surface TS for forming a synthetic image. On the other hand, as described above, in an off-road environment, the ground surface is hardly flat, which raises a higher possibility that the aforementioned visual impression is inconsistent with the actual ground-surface shape. As a result thereof, with a structure configured to employ the normal projection surface TS1 even in states of being on an off-road, there is a relatively higher risk of causing the user to have a sense of incongruity.

Figure 17:
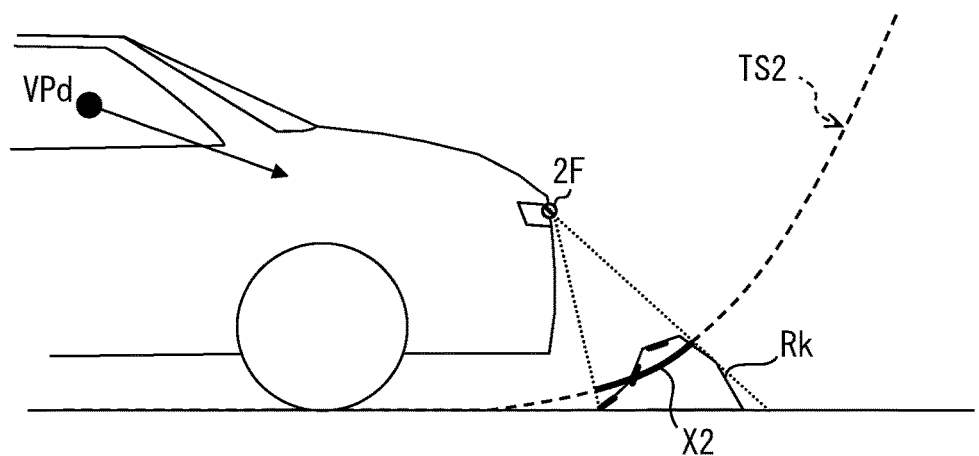
FIG. 17 is a view for explaining the way in which the rock Rk is viewed, in a case of employing the off-road projection surface TS2.

FIG. 17 is a view for explaining the position at which an image of the aforementioned rock Rk is projected, in a case of employing the off-road projection surface TS2 for forming a synthetic image CP. The image of the rock Rk which has been captured by the camera 2 is projected on the position at which a straight line connecting the position of this camera 2 and the position of the rock Rk to each other is intersected with the off-road projection surface TS2. In this case, there is not the flat-surface region R1 between the vehicle region R0 and the curved-surface region R2a in the off-road projection surface TS2. The image of the rock Rk is projected on the curved-surface region R2a. Namely, the image of the rock Rk is projected on a projection position X2 on the curved-surface region R2a.

As described above, in the case of employing the off-road projection surface TS2, the image of the rock Rk is projected on the projection position X2 which is closer to the vehicle region R0 than the projection position X1, on which the image of the rock Rk is projected in the case of employing the normal projection surface TS1. Further, the photographed surface of the rock Rk and the projection surface are positioned relatively close to each other, which can reduce the risk of stretching the image of the rock Rk and the degree thereof. In other words, it is possible to reduce the risk of causing the image of the rock Rk to be displayed in a form of being distorted, in the driver's view-point image CPd. As a result thereof, when the driver views the synthetic image CP, the driver has impression closer to that of when the driver directly views the rock Rk. Further, the driver is inhibited from having impression as if the periphery of one's subject vehicle is flat and impression as if stereoscopic objects are crushed.

Figure 18:
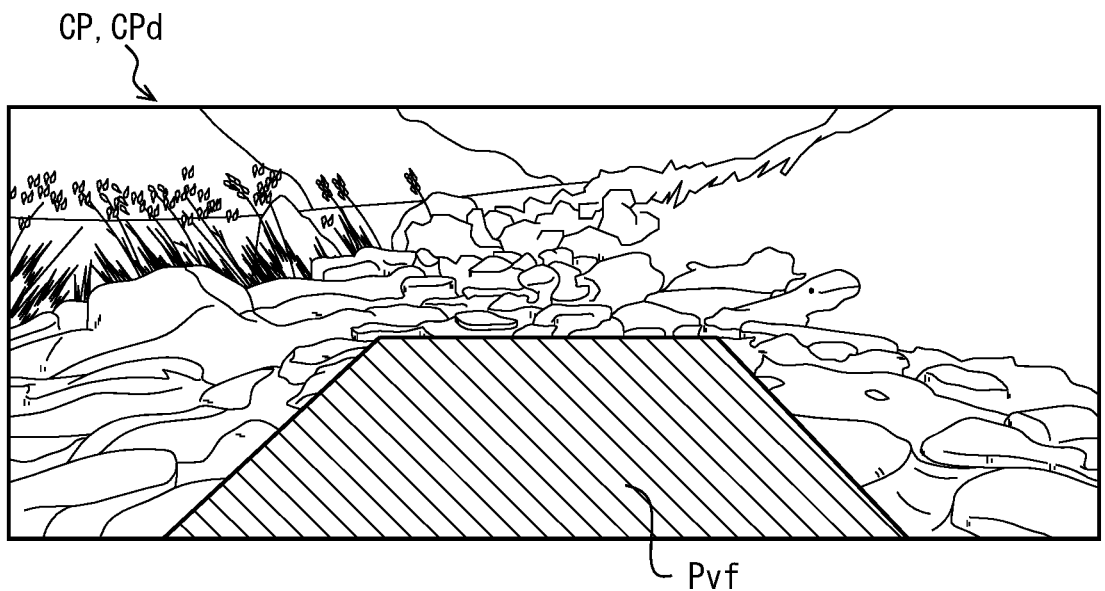
FIG. 18 is a line diagram of a driver's view-point image CPd formed using the normal projection surface TS1.
Figure 19:
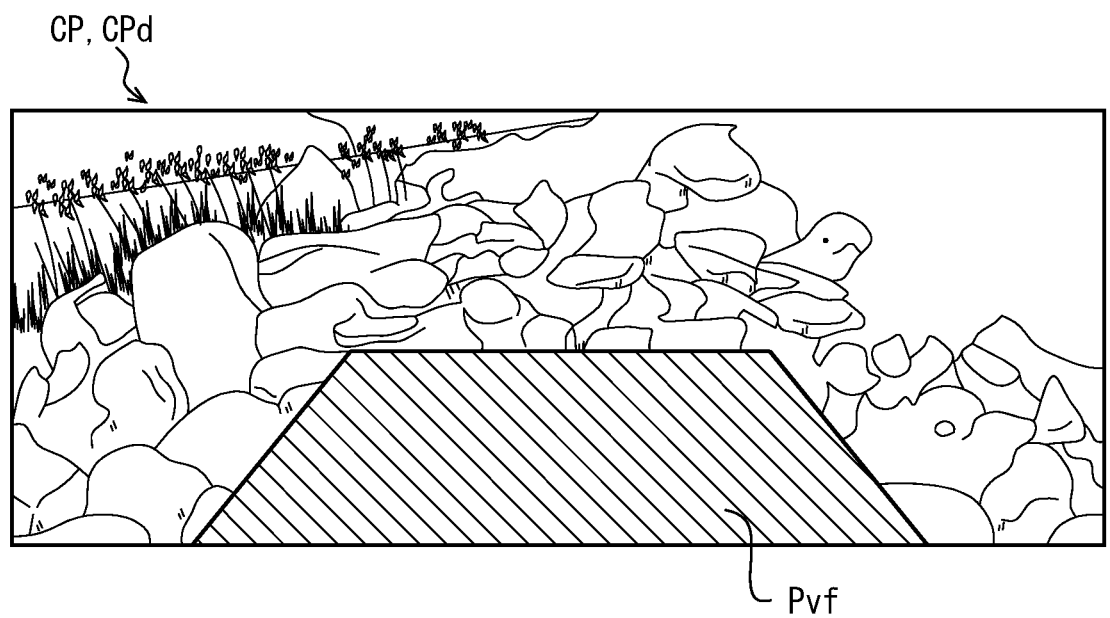
FIG. 19 is a line diagram of a driver's view-point image CPd formed using the off-road projection surface TS2.

FIGS. 18 and 19 illustrate two driver's view-point images CPd formed in the same off-road environment. FIG. 18 is a line drawing of a driver's view-point image CPd formed using the normal projection surface TS1. FIG. 19 is a line drawing of a driver's view-point image CPd formed using the off-road projection surface TS2. In FIGS. 18 and 19, these images are illustrated, by eliminating the display of constituent-member images Pve other than the floor image Pvf, such as the tire image, in order to ensure the visibility of the figures.

As can be seen from the comparison between the driver's view-point images CPd illustrated in FIGS. 18 and 19, the driver's view-point image CPd employing the off-road projection surface TS2 expresses rocks, stones and the like near the vehicle more stereoscopically than the driver's view-point image CPd employing the normal projection surface TS1.

As described above, when it has been determined that the travelling environment is an off-road, it is possible to reduce the risk of causing the user to have a sense of incongruity, by forming a synthetic image CP employing the off-road projection surface TS2 including no flat-surface region R1 outside the vehicle region R0. Further, it is possible to inhibit the user from misunderstanding the situation of the road surface in the periphery of one's subject vehicle, which allows the user to safely drive one's subject vehicle.

In addition, when it has been determined that the travelling environment is an on-road, it is possible to give the user visual impression of the road-surface shape which is consistent with the actual ground surface shape, by employing the normal projection surface TS1. Namely, by changing over the projection surface TS according to whether or not the travelling environment is an off-road, it is possible to reduce the risk of causing the user to have a sense of incongruity about respective scenes.

Although, in the aforementioned description, as the virtual view point VP of the synthetic image CP, there have been described the effects of the present embodiment by exemplifying the case of employing the driver's view point VPd having a sight direction oriented forwardly, the same effects can be provided in cases where the sight direction is oriented to other directions such as the rearward direction and obliquely-lateral directions. Further, the same effects can be provided in cases of placing the virtual view point VP at an arbitrary position inside the vehicle room, instead of the driver's view point VPd. In addition, the same effects can be expected, in cases of setting the virtual view point VP on the outer surface of the vehicle V or in a vehicle-around region outside the vehicle room. In this case, "the vehicle-around region" denotes a region at a distance of 0.2 m or less from the outer surface portion of the vehicle, for example.

"The outer surface portion" can include the rear-surface portion, the front edge portion and the roof, besides the left and right side surface portions. "The side surface portions" can include the door panels, the fender portions, the pillars and the like.

Although embodiments of the present disclosure have been described above, the present disclosure is not limited to the aforementioned embodiments. Various modifications which will be described later are also included in the technical range of the present disclosure. Further, the present disclosure can be implemented by making, thereto, various changes other than those which will be described later, without departing from the spirits thereof. For example, the various modifications which will be described later can be implemented, by being properly combined with each other within a range which causes no technical inconsistency. Members having the same functions as those of the members described in the aforementioned embodiments are designated by the same reference characters, and will not be described redundantly. When only a portion of a structure is described, the structures according to the aforementioned embodiments can be applied to the other portion thereof.

<Applications of an Under-Floor Recognition Image>

Although, in the aforementioned description, there has been disclosed an aspect where a synthetic image CP including an untransparent floor image Pvf is displayed as the driver's view-point image CPd, the present disclosure is not limited thereto. For example, during forward travelling of the vehicle, a front-camera image SF resulted from photographing the ground surface from just beneath the vehicle front edge to ahead thereof by 3 m can be stored in the RAM 12 and the like, and a synthetic image CP transparently showing the vehicle body bottom portion can be formed, using this image data having been stored along with travelling of one's subject vehicle. The image data to be projected on the under-floor portion may be updated any time along with travelling of the vehicle V. This display control can be also implemented during rearward travelling of the vehicle, as well as during forward travelling of the vehicle. During rearward travelling, it is possible to form an image of a region under the floor using rear-camera images SB.

<Supplemental Remarks Regarding the Off-Road Projection Surface TS2>

Figure 20:
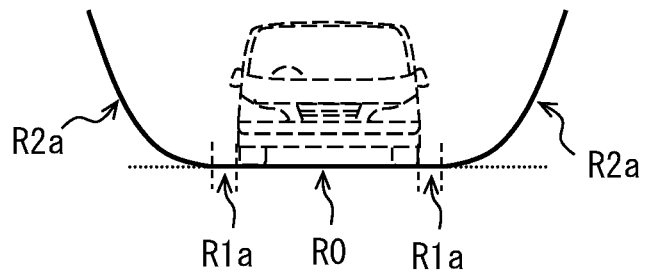
FIG. 20 is a view illustrating a modification of the off-road projection surface TS2.
Figure 21:
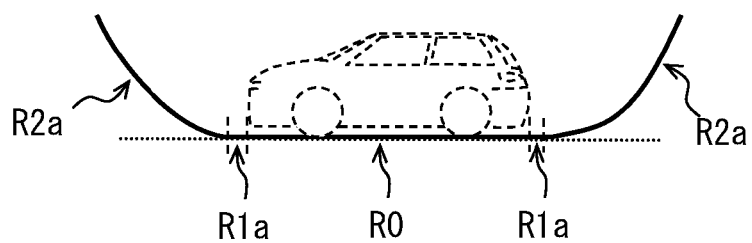
FIG. 21 is a view illustrating a modification of the off-road projection surface TS2.

Although, in the aforementioned description, the off-road projection surface TS2 does not include the flat-surface region, the present disclosure is not limited thereto. The off-road projection surface TS2 may also include a flat-surface region R1a having a width of less than 0.3 m, between the vehicle region R0 and the curved-surface region R2a, as illustrated in FIGS. 20 and 21. The flat-surface region R1a corresponds to an off-road flat-surface region. Since the flat-surface region R1a has a width of less than 0.3 m, the display range thereof in a driver's view-point image and the like is small. In addition, the region which exists at a distance of 0.3 m or less from the vehicle body is photographed from substantially just thereabove, since the camera 2 is positioned substantially just above this region. As a result thereof, even if an image resulted from photographing this region is projected on a flat projection surface, the image is less prone to be distorted. Therefore, since the flat-surface region R1a is small, the driver is inhibited from having impression as if stereoscopic objects near the vehicle are crushed. Namely, the same effects as those of the aforementioned embodiments can be provided, even when the off-road projection surface TS2 includes the small flat-surface region R1a in the side closer to the vehicle than the curved-surface region R2a.

The structures having been exemplified above, including the embodiments, correspond to a structure configured to place a curved-surface region in the projection surface TS closer to the vehicle when the travelling environment has been determined to be an off-road, than when the travelling environment has been determined to be an on-road. More specifically, when the travelling environment has been determined to be an on-road, the curved-surface start position is placed at a distance of equal to or more than 0.3 m from the vehicle. On the other hand, when the travelling environment has been determined to be an off-road, the curved-surface start position is placed at a position at a distance of less than 0.3 m from the vehicle. "The curved-surface start position" denotes the ground point at which the curved-surface region R2, R2a starts and can be regarded as the position at which the projection surface rises. The curved-surface start position can be defined as the ground point having an inclination of 3 to 5 degrees or more, for example, with respect to the flat plane to which the vehicle region R0 belongs. The structure configured to place the curved-surface start position at a position at a distance of less than 0.3 m from the vehicle includes a structure configured to place it at a position at a distance of 0.0 m from the vehicle, and a structure configured to place it inside the vehicle region.

<Utilization of Obstruction Information>

In situations where the travelling-environment determination unit F62 has determined that the travelling environment is an off-road, the inclination and the shape of the off-road projection surface TS2 may be dynamically adjusted, according to the result of detection by the sonars 8. For example, even when it has been determined that the environment is an off-road, the inclination of the curved-surface region R2a may be made smaller than a default value, if no obstruction has been detected in the periphery. Further, when it has been determined that the environment is an off-road, if it is detected that there exist a plurality of stereoscopic objects with heights equal to or more than a predetermined threshold value within a range at a predetermined distance or less from one's subject vehicle, the inclination (actually, the coefficient a2) of the curved-surface region R2a may be made larger than the default value. When the ground surface in the periphery of the vehicle has a degree of convexity and concavity equal to or more than a predetermined value, such as when the number of detected stereoscopic objects is equal to or more than a predetermined value, similarly, the inclination (actually, the coefficient a2) of the curved-surface region R2a may be made larger than the default value. The inclination of the curved-surface region R2a can be adjusted with the coefficient a2, in actual.

Figure 22:
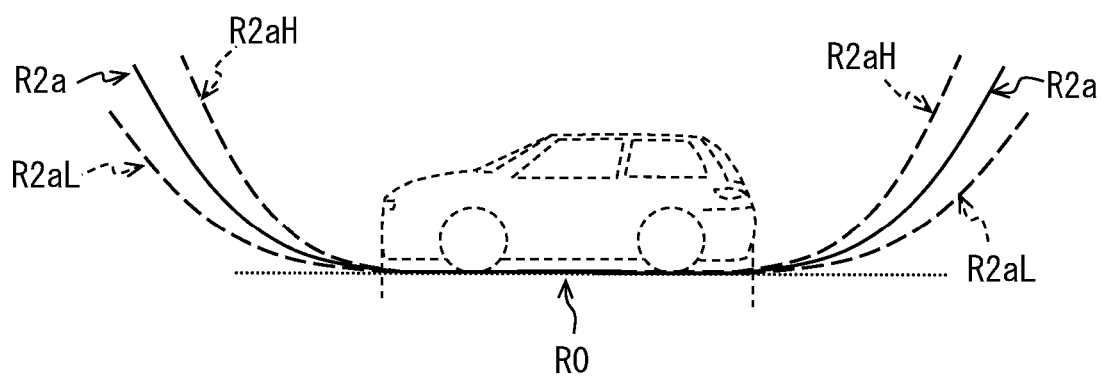
FIG. 22 is a view illustrating a modification of the off-road projection surface TS2.

In FIG. 22, "R2aH" represents the curved-surface region in a case of setting the inclination to be larger than the default value, and "R2aL" represents the curved-surface region in a case of setting the inclination to be smaller than the default value. For convenience, the projection surface TS including the curved-surface region R2aL is also referred to as a small-inclination projection surface TS3. The projection surface TS including the curved-surface region R2aH is also referred to as a large-inclination projection surface TS4. In view of the inclination of the curved-surface region R2a, an off-road projection surface TS2 positioned between the small-inclination projection surface TS3 and the large-inclination projection surface TS4 is also referred to as an intermediate projection surface. Also, rather than adjusting the inclination of the curved-surface region R2a in the off-road projection surface TS2 with respect to the default value, it is possible to dynamically determine the inclination of the curved-surface region R2a within a predetermined range, according to the situation of obstruction detection by the sonars 8. Besides, the shape of the curved-surface region R2a in the off-road projection surface TS2 is not limited to a downwardly-convex curved-surface shape. The curved-surface region R2a may have an upwardly-convex curved-surface shape.

<Supplemental Remarks Regarding the Obstruction Sensors>

Although, in the aforementioned description, there has been exemplified the structure employing the sonars 8, as sensors for detecting objects existing in the periphery of the vehicle (so-called obstruction sensors), the obstruction sensors may be constituted by millimeter-wave radars, or LiDARs (Light Detection and Ranging/Laser Imaging Detection and Ranging). The image formation ECU 1 can be used by being connected to various obstruction sensors.

<Supplemental Remarks Regarding the Travelling-Environment Determination Unit>

The travelling-environment determination unit F62 may be also structured to determine the types of off-roads, by combining the aforementioned various determination materials. Off-roads can be roughly divided into stereoscopic roads with many convexities and concavities, such as rocky roads and mogul roads, and slippery roads, such as muddy roads, sandy roads, glass fields, snow fields. Such slippery roads denote ground surfaces having relatively moderate gradient changes and relatively moderate concavities and convexities. For example, the travelling-environment determination unit F62 may be also structured to distinguish stereoscopic roads and slippery roads from each other, as types of off-roads, based on at least one of the result of image recognition, the result of detection by the sonars, and the travelling mode being set.

The projection-surface control unit F63 may be configured to change the shape pattern of the projection surface to be employed, according to the type of the off-road which has been determined by the travelling-environment determination unit F62. For example, if the travelling-environment determination unit F62 determines that the travelling environment is a stereoscopic road, an off-road projection surface TS2 for stereoscopic roads is employed. On the other hand, if the travelling-environment determination unit F62 determines that the travelling environment is a slippery road, an off-road projection surface TS2 for slippery roads is employed. As the off-road projection surface TS2 for slippery roads, it is possible to employ the small-inclination projection surface TS3, for example. As the off-road projection surface TS2 for stereoscopic roads, it is possible to employ the intermediate projection surface or the large-inclination projection surface TS4, for example. The off-road projection surface TS2 for stereoscopic roads is required only to have a larger inclination in the curved-surface region R2a than that of the curved-surface region R2a in the small-inclination projection surface TS3.

With the aforementioned structure, it is possible to employ the projection surface TS according to the type of an off-road, out of various off-roads. This enables forming a driver's view-point image CPd which is less prone to give a sense of incongruity.

<Supplemental Remarks Regarding the Off-Road Display Mode>

Figure 23:
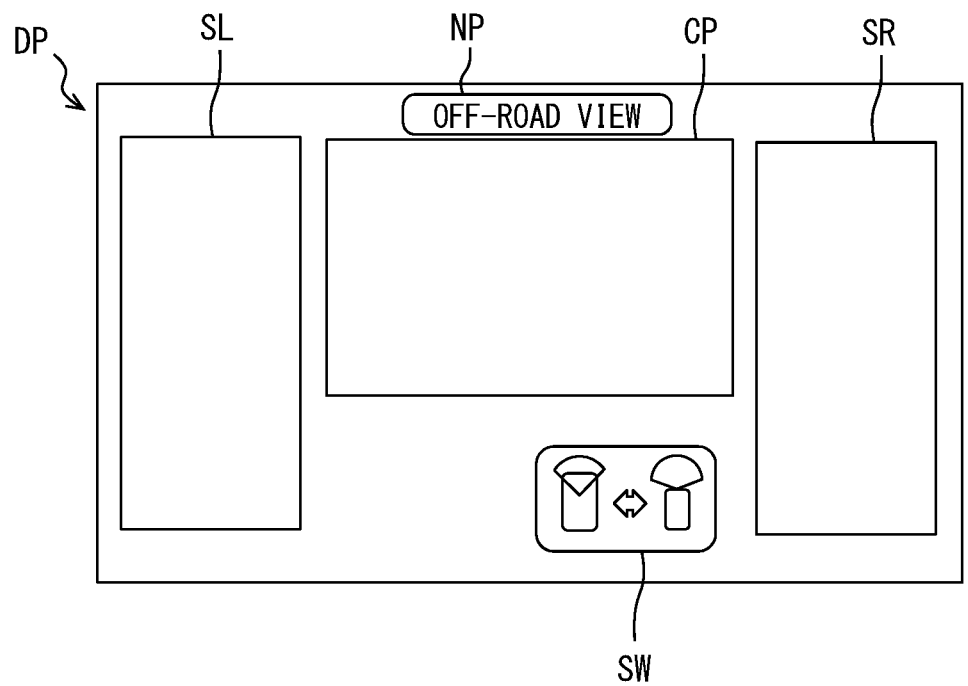
FIG. 23 is a view illustrating an example of display of a notification image NP indicating that an off-road display mode is being set.

The display-image formation unit F8 may place a notification image NP indicating that an off-road display mode is being set, at a corner portion and the like of a displayed image DP, as illustrated in FIG. 23, when the off-road display mode is being set, namely when the off-road projection surface TS2 is being employed as the projection surface TS. With this structure, it is possible to reduce the risk of perplexing the driver, since the ground surface is viewed differently from usual.

It is also possible to change over between displaying and undisplaying the notification image NP, according to the material which causes the off-road determination. For example, when the travelling environment has been determined to be an off-road, based on a user's manipulation on the manipulation members such as the manipulation buttons 5, the touch panel 4, the shift lever, the notification image NP is not displayed. On the other hand, when the travelling environment has been automatically determined to be an off-road, based on information other than user's manipulations, such as the result of image recognition or the result of detection by the sonars, the notification image NP may be displayed. When the projection surface has been changed over in response to a user's manipulation on the manipulation members, the user recognizes that the vehicle V is operating in the off-road mode, which enables eliminating the unnecessary notification, thereby reducing botheration. On the other hand, when the projection surface TS has been automatically changed over, there is a possibility of a malfunction and, therefore, by providing a notification that the off-road display mode is being set, it is possible to reduce the risk of perplexing the user.

<Regarding Variations of the Virtual View Point>

Although, in the aforementioned description, there have been exemplified the bird's-eye view point VPb and the driver's view point VPd as the virtual view point VP, the combination of the position and the direction of the virtual view point VP which can be set is not limited to the aforementioned example. As the virtual view point VP, it is possible to employ a pattern where the view-point position is set at the left and rearward of one's subject vehicle, and the field-of-view direction is set to be the forward direction of one's subject vehicle. The virtual view point VP can be placed at various positions outside the vehicle room. Also, the virtual view point VP may be made placeable at an arbitrary position inside the vehicle room.

Figure 24:
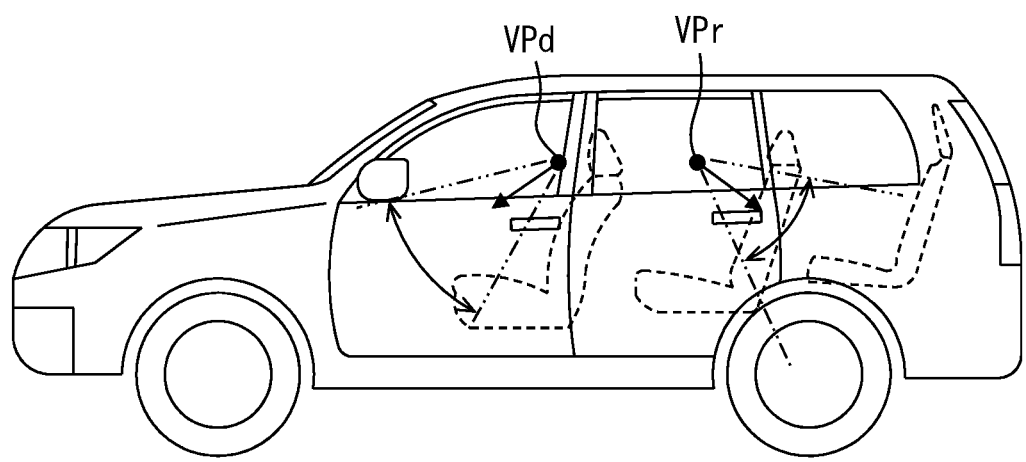
FIG. 24 is a view illustrating an example of the position at which a virtual view point VP other than the driver's view point VPd is set, inside a vehicle room.

As the virtual view point VP, it is also possible to employ a pattern where the view-point position is placed near a side mirror, a setting pattern where the view-point position is placed at the center of the ceiling portion inside the vehicle room, and the like. Further, the view-point control unit F64 may be structured to set a room-inside rearward view point VPr, which is at a view-point position rearward of the eyellipse by a predetermined distance and, further, has a sight direction oriented rearward and obliquely-downward, as illustrated in FIG. 24. By employing this room-inside rearward view point VPr, it is possible to form and display a room-inside view point rearward image, which is a synthetic image CP including the vicinity of the rear wheels and the rearward of the vehicle, as a synthetic image CP to be displayed during rearward travelling of the vehicle. As a result thereof, the driver is enabled to easily recognize the states of the rear wheels and the vicinity of the rear bumper, during rearward travelling, similarly to during forward travelling. Further, it is preferable that the room-inside view point rearward image includes a tire image corresponding to the rear wheels, a body border line and the like, similarly to the driver's view-point image CPd. With this structure, it is possible to easily recognize the positional relationship between the respective members constituting the vehicle and objects outside the vehicle room.

<Remarks>

The device, the system and the methodology therefor which have been disclosed in the present disclosure may be realized by dedicated computers which constitute processors programmed for executing one or more functions concretized by computer programs. The device and the methodology therefor which have been disclosed in the present disclosure may be also realized using dedicated hardware logic circuits. The device and the methodology therefor which have been disclosed in the present disclosure may be also realized by one or more dedicated computers constituted by the combination of a processor for executing computer programs and one or more hardware logic circuits. The computer programs as instructions to be executed by the computers may be stored in computer-readable non-transitory tangible storage mediums. Namely, the means and/or the functions which are provided by the processing unit 11 and the like may be provided by software stored in tangible memory devices and computers for executing them, only software, only hardware, or a combination thereof. For example, some or all of the functions included in the processing unit 11 may be realized as hardware. Aspects where a certain function is realized by hardware include aspects where the function is realized using one or more ICs and the like. The processing unit 11 may be also realized by using an MPU, a GPU or a DFP (Data Flow Processor), instead of a CPU. The processing unit 11 may be also realized by the combination of a plurality of types of arithmetic processing devices, such as a CPU, an MPU, and a GPU. The processing unit 11 may be also realized as a system-on-chip (SoC). Further, the various types of processing units may be also realized by using FPGAs (Field-Programmable Gate Arrays) or ASICs (Application Specific Integrated Circuits). The various types of programs may be stored in non-transitory tangible storage mediums. As mediums for storing the programs, it is possible to employ various storage mediums, such as HDDs (Hard-disk drives), SSDs (Solid State Drives), flash memories, SDs (Secure Digital) cards, and the like.

The scope of the present disclosure includes not only the aforementioned image forming device, but also various aspects, such as systems including this image forming device as a constituent element. For example, the scope of the present disclosure also includes programs for causing a computer to function as an image forming device, non-transitory tangible storage mediums such as semiconductor memories which store these programs, and other aspects.

The invention claimed is:

1. An image forming device for a vehicle, comprising:
 an image acquisition unit configured to acquire a plurality of camera images obtained by a plurality of cameras, which are configured to photograph a periphery of the vehicle;
 an image synthesizing unit configured to project data of the plurality of camera images on a virtual projection surface, which corresponds to the periphery of the vehicle, and to form a synthetic image showing the periphery of the vehicle, which is viewed from a virtual view point, by using the data projected on the projection surface; and
 a travelling-environment determination unit configured to determine whether a travelling environment of the vehicle is an off-road or an on-road based on a signal from an other on-board device of the vehicle, wherein the image synthesizing unit is configured to change a shape of the projection surface, which is for forming the synthetic image, according to whether the travelling-environment determination unit determines that the travelling environment is an off-road.

2. The image forming device according to claim 1, wherein
the image synthesizing unit is configured to form the synthetic image by using, as the projection surface, an on-road projection surface having a predetermined shape when the travelling-environment determination unit determines that the travelling environment is an on-road, and
the image synthesizing unit is configured to form the synthetic image by using, as the projection surface, an off-road projection surface having a shape different from the shape of the on-road projection surface when the travelling-environment determination unit determines that the travelling environment is an off-road.

3. The image forming device according to claim 2, wherein
the on-road projection surface has an on-road flat-surface region with a flat-surface shape around a vehicle region, which is a region in which the vehicle resides, and
the off-road projection surface has an off-road curved-surface region with a curved-surface shape connected to an edge portion of the vehicle region.

4. The image forming device according to claim 2, wherein
the on-road projection surface has an on-road flat-surface region with a flat-surface shape around a vehicle region, which is a region in which the vehicle resides, and an on-road curved-surface region with a curved-surface shape outside the on-road flat-surface region,
the off-road projection surface has an off-road flat-surface region with a flat-surface shape around the vehicle region and an off-road curved-surface region with a curved-surface shape outside the off-road flat-surface region, and
the off-road flat-surface region is smaller than the on-road flat-surface region.

5. The image forming device according to claim 4, wherein
the on-road flat-surface region is formed from the vehicle region up to a position at a predetermined minimum flat-surface distance or more in forward, rearward, leftward, and rightward directions, and
in the off-road projection surface, the off-road flat-surface region formed between the vehicle region and the off-road curved-surface region has a width which is less than the minimum flat-surface distance.

6. The image forming device according to claim 2, wherein
the on-road projection surface has an on-road curved-surface region with a downwardly-convex curved-surface shape outside a vehicle region, which is a region in which the vehicle resides,
the off-road projection surface has an off-road curved-surface region with a downwardly-convex curved-surface shape outside the vehicle region, and
the off-road curved-surface region is closer to the vehicle region than the on-road curved-surface region.

7. The image forming device according to claim 4, wherein the off-road curved-surface region and the on-road curved-surface region have downwardly-convex curved-surface shapes, respectively, and
the off-road curved-surface region has an inclination larger than an inclination of the on-road curved-surface region.

8. The image forming device according to claim 1, wherein
the image forming device is configured to be connected to an obstruction sensor configured to detect a stereoscopic object existing in the periphery of the vehicle,
the image forming device further comprising:
an obstruction-information acquisition unit configured to acquire a signal indicating a result of detection by the obstruction sensor, wherein
the travelling-environment determination unit is configured to determine that the travelling environment is an off-road based on detection of a plurality of stereoscopic objects in the periphery of the vehicle by the obstruction sensor.

9. The image forming device according to claim 1, further comprising:
an image recognition unit configured to analyze the camera images to detect a predetermined detected object, wherein
the travelling-environment determination unit is configured to determine that the travelling environment is an off-road based on at least one of detection of a plurality of rocks by the image recognition unit, detection of no lane marking by the image recognition unit, or detection of no road edge by the image recognition unit.

10. The image forming device according to claim 1, wherein
the vehicle has, as a travelling mode, an off-road mode, which is a mode for travelling on an off-road, wherein
the travelling-environment determination unit is configured to determine whether the travelling environment is an off-road based on a signal from an on-board input device of the vehicle configured to change over the travelling mode to the off-road mode.

11. The image forming device according to claim 1, wherein
the image synthesizing unit is configured to selectively employ, as the projection surface for an off-road, a plurality of projection surfaces, which have respective different shapes,
the travelling-environment determination unit is configured to determine a type of an off-road based on the signal from the on-board device when the travelling environment is determined to be an off-road, and
the image synthesizing unit is configured to change the projection surface, which is for forming the synthetic image, according to the type of the off-road determined by the travelling-environment determination unit.

12. The image forming device according to claim 1, wherein
the image forming device is configured to cause a display device to display a notification image, which indicates that an image for an off-road is displayed, when the image synthesizing unit forms the synthetic image by using the projection surface for an off-road.

13. An image forming method for forming an image for assisting driving of a vehicle, the method comprising:
acquiring a plurality of camera images obtained by a plurality of cameras, which are configured to photograph a periphery of the vehicle;

projecting data of the plurality of camera images on a virtual projection surface, which corresponds to the periphery of the vehicle, and forming a synthetic image showing the periphery of the vehicle, which is viewed from a virtual view point, by using the data projected on the projection surface;

determining whether a travelling environment of the vehicle is an off-road or an on-road based on a signal from an other on-board device of the vehicle; and changing a shape of the projection surface, which is for forming the synthetic image, according to determination whether the travelling environment is an on-road.

14. An image forming device for a vehicle, comprising:

at least one processor configured to:

acquire a plurality of camera images obtained by a plurality of cameras, which are configured to photograph a periphery of the vehicle;

project data of the plurality of camera images on a virtual projection surface and form a synthetic image showing the periphery of the vehicle, which is viewed from a virtual view point, by using the data projected on the projection surface;

determine whether a travelling environment of the vehicle is an off-road or an on-road; and change a shape of the projection surface according to determination whether the travelling environment is an off-road.

* * * * *